US012671305B2

(12) United States Patent (10) Patent No.: US 12,671,305 B2
Ogasawara (45) Date of Patent: Jun. 30, 2026

(54) ELECTROMAGNETIC ACTUATOR

(71) Applicant: MIKUNI CORPORATION, Tokyo (JP)

(72) Inventor: Toshiki Ogasawara, Iwate (JP)

(73) Assignee: MIKUNI CORPORATION, Tokyo (JP)

( * ) Notice: Subject to any disclaimer, the term of this patent is extended or adjusted under 35 U.S.C. 154(b) by 301 days.

(21) Appl. No.: 18/633,546

(22) Filed: Apr. 12, 2024

(65) Prior Publication Data

US 2024/0380297 A1 Nov. 14, 2024

(30) Foreign Application Priority Data

May 10, 2023 (JP) ................................. 2023-077672

(51) Int. Cl.
*H02K 41/02* (2006.01)
*H02K 5/10* (2006.01)
*H02K 33/02* (2006.01)

(52) U.S. Cl.
CPC .............. *H02K 41/02* (2013.01); *H02K 5/10* (2013.01); *H02K 33/02* (2013.01); *H02K 2203/12* (2013.01)

(58) Field of Classification Search
CPC .......... H02K 41/02; H02K 5/10; H02K 33/02; H02K 2203/12; H02K 7/1884; H02K 7/1876; H02K 33/12; H02K 33/16; F02B 71/06; F02B 63/041; F02B 71/04; F04B 35/045; F04B 17/04
USPC ............ 310/12, 4, 30, 15, 14, 12.17, 35, 34, 310/12.23, 12.12; 417/11, 56, 258, 417/398–403
See application file for complete search history.

(56) References Cited

U.S. PATENT DOCUMENTS

| | | | | |
|---|---|---|---|---|
| 4,253,493 A | * | 3/1981 | English ................. | F16K 31/082 |
| | | | | 137/625.5 |
| 5,146,124 A | * | 9/1992 | Higham .................... | F16F 7/116 |
| | | | | 417/901 |
| 5,440,183 A | * | 8/1995 | Denne .................... | F15B 15/088 |
| | | | | 310/12.26 |
| 5,734,209 A | * | 3/1998 | Hallidy ................. | E21B 43/128 |
| | | | | 310/12.21 |

(Continued)

FOREIGN PATENT DOCUMENTS

JP 7031171 3/2022

*Primary Examiner* — Maged M Almawri
(74) *Attorney, Agent, or Firm* — JCIPRNET

(57) ABSTRACT

An electromagnetic actuator includes a mover, a stator, a bobbin module, and a first annular seal member. The bobbin module includes: a through hole, through which the stator passes along an axis line; a bobbin side receiving part, adjacent to an outer side of one end opening of the through hole and receiving the first annular seal member; and a protrusion, protruding from an inner wall surface near the one end opening. The stator includes: an outer peripheral fitting part, fitted into the protrusion; and a stator side receiving part, receiving the first annular seal member in cooperation with the bobbin side receiving part. The bobbin module and the stator define a communication path that communicates from an internal space of the through hole deviated from the protrusion to the first annular seal member in an assembled state in which the outer peripheral fitting part is fitted into the protrusion.

16 Claims, 24 Drawing Sheets

(56) References Cited

U.S. PATENT DOCUMENTS

| | | | | |
|---|---|---|---|---|
| 5,814,907 | A * | 9/1998 | Bandera | H01F 7/1615 |
| | | | | 310/23 |
| 5,896,076 | A * | 4/1999 | van Namen | H01F 7/1615 |
| | | | | 335/229 |
| 6,323,567 | B1 * | 11/2001 | Hazelton | H02K 41/03 |
| | | | | 310/12.33 |
| 6,608,408 | B1 * | 8/2003 | Denne | H02K 41/031 |
| | | | | 310/34 |
| 8,449,274 | B1 * | 5/2013 | Zelechonok | F04B 17/04 |
| | | | | 417/419 |
| 9,435,347 | B2 * | 9/2016 | Danguy | F04D 29/049 |
| 9,534,629 | B1 * | 1/2017 | Lucas | F16C 32/0614 |
| 11,339,794 | B2 * | 5/2022 | Uneura | F04D 13/12 |
| 11,988,219 | B2 * | 5/2024 | Kuga | F02K 9/46 |
| 2002/0176790 | A1 * | 11/2002 | Akazawa | F04B 35/045 |
| | | | | 417/417 |
| 2005/0023905 | A1 * | 2/2005 | Sakamoto | H02K 33/16 |
| | | | | 310/12.17 |
| 2010/0277012 | A1 * | 11/2010 | Kobayashi | H02K 7/1884 |
| | | | | 310/30 |
| 2012/0175974 | A1 * | 7/2012 | Robertson | H01F 7/1646 |
| | | | | 310/12.26 |
| 2012/0279234 | A1 * | 11/2012 | Aigouy | F04B 35/045 |
| | | | | 310/12.04 |
| 2012/0280513 | A1 * | 11/2012 | Cockerill | F01L 9/20 |
| | | | | 290/1 A |
| 2013/0342036 | A1 * | 12/2013 | Akazawa | H02K 35/04 |
| | | | | 310/28 |
| 2015/0076930 | A1 * | 3/2015 | Kondo | H01F 7/1607 |
| | | | | 310/12.02 |
| 2015/0192218 | A1 * | 7/2015 | Arend | F16K 31/0679 |
| | | | | 310/38 |
| 2015/0369237 | A1 * | 12/2015 | Ahn | F04B 35/045 |
| | | | | 417/564 |
| 2017/0074418 | A1 * | 3/2017 | Liang | H01F 27/28 |
| 2017/0254438 | A1 * | 9/2017 | Ulbricht | F16K 31/0679 |
| 2018/0073557 | A1 * | 3/2018 | Hwang | F16C 19/02 |
| 2019/0032649 | A1 * | 1/2019 | Roh | F04B 39/123 |
| 2019/0048787 | A1 * | 2/2019 | Baeuerle | F04B 35/045 |
| 2023/0039432 | A1 * | 2/2023 | Abdul | F16C 33/583 |
| 2024/0413701 | A1 * | 12/2024 | White | F16J 15/002 |

* cited by examiner

ELECTROMAGNETIC ACTUATOR

CROSS-REFERENCE TO RELATED APPLICATIONS

This application claims the priority benefit of Japan Application No. 2023-077672, filed on May 10, 2023. The entirety of the above-mentioned patent application is hereby incorporated by reference herein and made a part of this specification.

BACKGROUND

Technical Field

The disclosure relates to an electromagnetic actuator using electromagnetic force of a solenoid as a driving force, and in particular, to an electromagnetic actuator equipped with a cylindrical stator (inner yoke) that accommodates a mover to be capable of reciprocating.

Related Art

As a conventional electromagnetic actuator, there has been known an electromagnetic solenoid including: a plunger (mover), reciprocating in a predetermined axis line direction; a shaft pin, fixed to the plunger; a first core part (first stator) and a second core part (second stator), as an inner yoke consisting of two members that accommodate the plunger to be capable of reciprocating and form a magnetic path; a cylindrical resin collar, positioning (aligning axial centers of) the first core part and the second core part; a bobbin, arranged around the inner yoke and the collar; a coil for excitation, wound around the bobbin; a case, as an outer yoke that forms a magnetic path; and two seal members, arranged between the bobbin and the case (see, for example, Japanese Patent No. 7031171).

In the above electromagnetic actuator, on both end faces of the bobbin in the reciprocating direction of the plunger, the seal members are interposed between the bobbin and the case and only perform a sealing function. In the case of press-fitting the first core part and the second core part into the collar for positioning, outer wall surfaces of the first core part and the second core part are inserted while pressing an inner wall surface of the collar.

Accordingly, there is a risk that foreign matter, such as dust adhering to the outer wall surfaces of the first core part and the second core part or the inner wall surface of the collar or shavings caused by scraping the inner wall surface of the collar, may enter a movement space of the plunger and the shaft pin and cause jamming, resulting in malfunction. Hence, a structure is desired which makes it possible to remove foreign matter such as shavings when the foreign matter occurs.

SUMMARY

An electromagnetic actuator of the disclosure includes: a mover, reciprocating along a predetermined axis line; a stator, accommodating the mover to be capable of recipro-cating in a direction of the axis line; a bobbin module, arranged around the stator; and a first annular seal member, interposed between the bobbin module and the stator. The bobbin module includes: a through hole, through which the stator passes in the direction of the axis line; a bobbin side receiving part, formed adjacent to an outer side of one end opening of the through hole and receiving the first annular seal member; and a protrusion, formed protruding from an inner wall surface near the one end opening of the through hole. The stator includes: an outer peripheral fitting part, fitted into the protrusion; and a stator side receiving part, receiving the first annular seal member in cooperation with the bobbin side receiving part. The bobbin module and the stator define a communication path that communicates from an internal space of the through hole deviated from the protrusion to the first annular seal member in an assembled state in which the outer peripheral fitting part is fitted into the protrusion.

DESCRIPTION OF THE EMBODIMENTS

Figure 1:
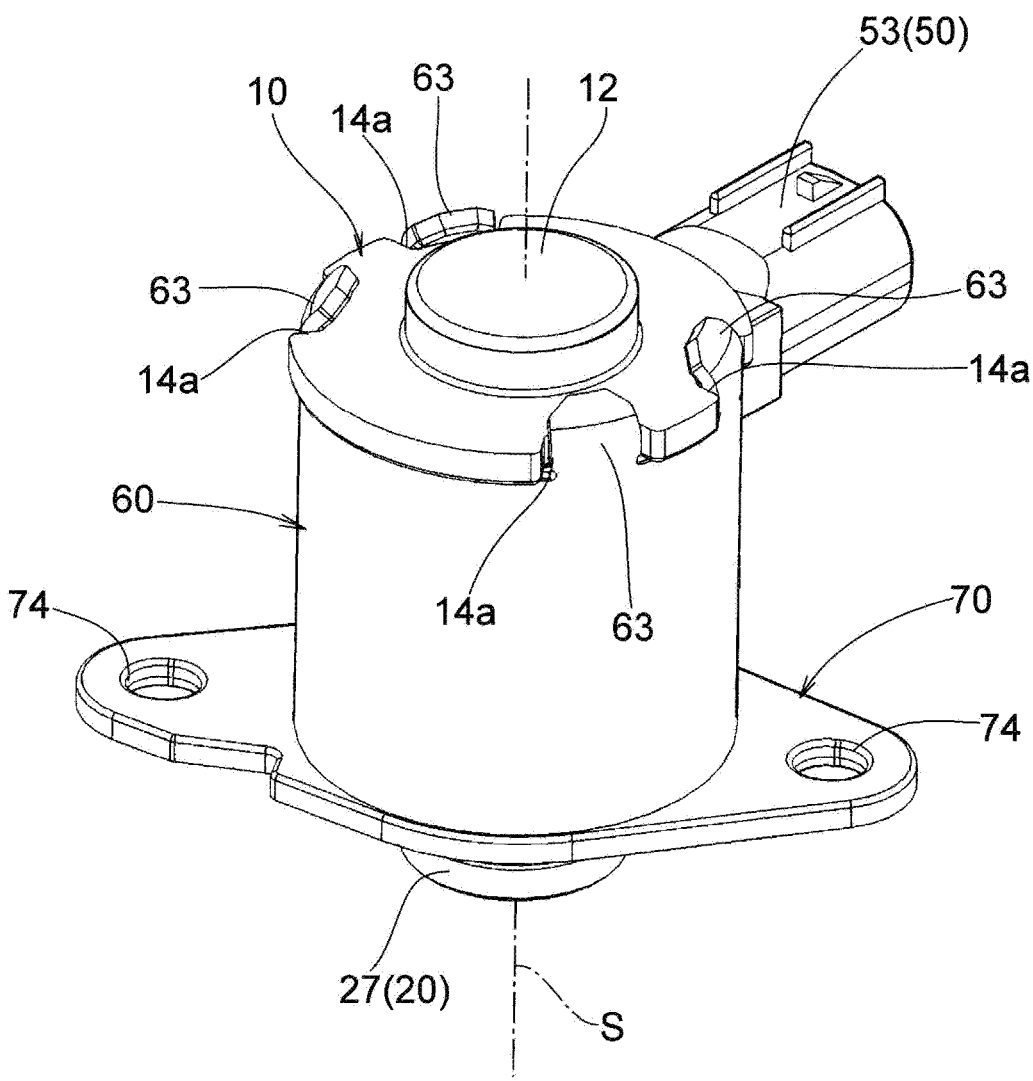
FIG. 1 shows an electromagnetic actuator according to an embodiment of the disclosure, and is an external perspective view as seen obliquely from one direction.
Figure 2:
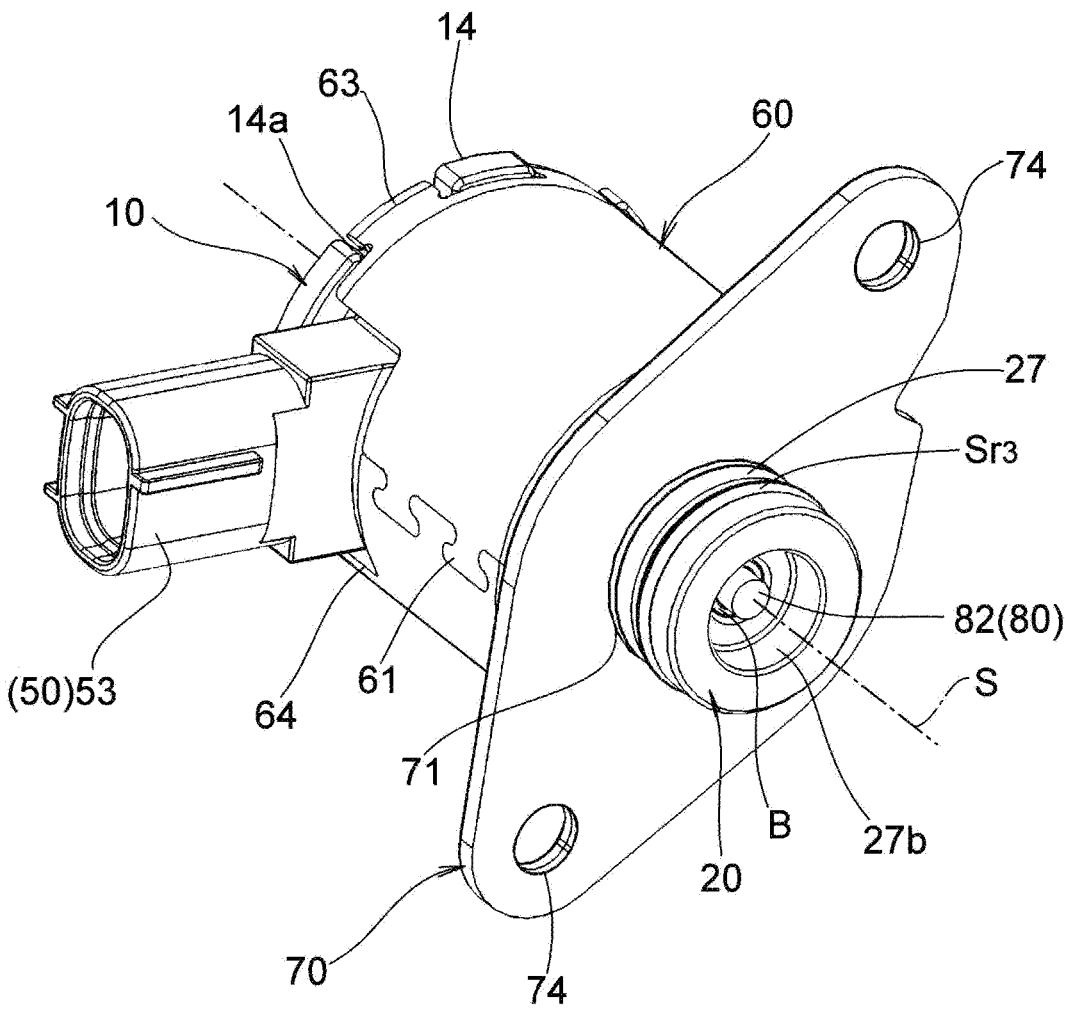
FIG. 2 shows an electromagnetic actuator according to an embodiment, and is an external perspective view as seen from another direction (side where the electromagnetic actuator is attached to an application object).

The disclosure provides an electromagnetic actuator in which, while the structure is simplified, the cost is reduced and the number of parts is reduced, foreign matter such as shavings can be removed and smooth operation of a mover may be ensured.

In the above electromagnetic actuator, a configuration may be adopted in which the bobbin module includes an annular tapered surface in an inner peripheral area of the one end opening of the through hole. The protrusion is formed in an area deviated from the annular tapered surface in the direction of the axis line.

In the above electromagnetic actuator, a configuration may be adopted in which the stator includes a first stator and a second stator arranged spaced apart in the direction of the axis line. The first annular seal member is arranged between the first stator and the bobbin module.

In the above electromagnetic actuator, a configuration may be adopted in which the bobbin module includes: a bobbin, defining the through hole and the protrusion; a coil for excitation, wound around the bobbin; and an outer cover member, covering the coil and in which a connector that surrounds a terminal connected to an end of the coil is formed.

In the above electromagnetic actuator, a configuration may be adopted in which the bobbin side receiving part is formed in the outer cover member or the bobbin.

In the above electromagnetic actuator, a configuration may be adopted in which a second annular seal member is arranged between the second stator and the bobbin.

In the above electromagnetic actuator, a configuration may be adopted in which the bobbin includes: a first positioning part, formed near the one end opening of the through hole in the direction of the axis line and positioning the first stator on the axis line; and a second positioning part, formed near the other end opening of the through hole in the direction of the axis line and positioning the second stator on the axis line. The protrusion is the first positioning part.

In the above electromagnetic actuator, a configuration may be adopted in which the through hole includes: a first through hole, centered on the axis line; and a second through hole, adjacent to the first through hole in the direction of the axis line and having a smaller diameter than the first through hole. The first positioning part includes, in an area of the first through hole, a plurality of ridges protruding from an inner wall surface of the first through hole and extending in the direction of the axis line. The communication path is defined by a recessed area between the plurality of ridges.

In the above electromagnetic actuator, a configuration may be adopted in which the outer peripheral fitting part is fitted halfway into the first positioning part in the direction of the axis line.

In the above electromagnetic actuator, a configuration may be adopted in which the first stator includes: a cylindrical part, defining an inner peripheral surface that receives the mover; a bottom wall, blocking one end side of the cylindrical part and defining a rest position of the mover; and a flange, extending in a radial direction from the cylindrical part. The second stator includes an insertion hole that receives the mover and exposes the mover at a tip thereof.

In the above electromagnetic actuator, a configuration may be adopted in which the stator side receiving part is the flange. The bobbin side receiving part is an annular receiving part formed in the bobbin module to receive the first annular seal member in cooperation with the flange in the direction of the axis line.

In the above electromagnetic actuator, a configuration may be adopted in which the mover includes: a plunger, made of a magnetic material; and a shaft, made of a nonmagnetic material, fixed to the plunger, and exerting a driving force to the outside. The second stator includes: a stopper, defining an operating position of the mover; and a guide hole, slidably guiding the shaft. The inner peripheral surface of the first stator receives the plunger in a non-contact manner to be capable of reciprocating. The insertion hole of the second stator receives the shaft in a non-contact manner to be capable of reciprocating.

In the above electromagnetic actuator, a configuration may be adopted including an outer magnetic path member that is connected to the first stator and the second stator and forms a magnetic path.

In the above electromagnetic actuator, a configuration may be adopted in which the outer magnetic path member includes: a cylindrical member, connected to the first stator and surrounding the bobbin module; and a flat plate member, connected to the second stator and the cylindrical member.

In the above electromagnetic actuator, a configuration may be adopted in which the flat plate member also serves as a flange member for attachment to an attachment object.

In the above electromagnetic actuator, a configuration may be adopted in which the mover is provided with a buffer unit that absorbs impact upon the mover contacting the first stator and returning to the rest position.

According to the electromagnetic actuator having the above configuration, while the structure is simplified, the cost is reduced and the number of parts is reduced, foreign matter such as shavings can be removed and smooth operation of the mover can be ensured.

Hereinafter, embodiments of the disclosure are described with reference to the accompanying drawings.

An electromagnetic actuator according to the disclosure is applied to an application object that exerts a driving force to the outside, for example, a cam switching mechanism of an internal combustion engine, or an oil passage switching valve or other on/off switching mechanisms.

As shown in FIG. 1 to FIG. 13, an electromagnetic actuator according to an embodiment includes: a first stator 10 and a second stator 20 as a stator; a bobbin module Bm; a cylindrical member 60 and a flat plate member 70 as an outer magnetic path member; a mover 80; a buffer unit 90; and annular seal members $Sr_1$, $Sr_2$, and $Sr_3$. Here, the bobbin module Bm includes a bobbin 30, a coil 40 for excitation, terminals 41 and 42, and an outer cover member 50 in which the bobbin 30 and the coil 40 are embedded.

The first stator 10 is formed by machining or forging using soft iron or the like, and functions as a magnetic path through which a line of magnetic force passes. As shown in FIG. 3 to FIG. 5, FIG. 10, and FIG. 11, the first stator 10 includes a cylindrical part 11, a bottom wall 12, an outer peripheral fitting part 13, and a flange 14.

The cylindrical part 11 includes an inner peripheral surface 11a and an outer peripheral surface 11b centered on an axis line S. In order to accommodate a plunger 81 of the mover 80 in a non-contact manner so that the plunger 81 is freely movable in the axis line S direction, the inner peripheral surface 11a faces an outer peripheral surface 81a of the mover 80 (plunger 81) with a predetermined gap in a radial direction perpendicular to the axis line S.

The outer peripheral surface 11b is formed as a cylindrical surface centered on the axis line S on both sides of the flange 14 in the axis line S direction. In an assembled state, the outer peripheral surface 11b is maintained not in contact with a first through hole 32 and an annular tapered surface 32b of the bobbin 30.

The bottom wall 12 is continuous with the cylindrical part 11 and is formed in a disk shape perpendicular to the axis line S, covers the mover 80 in cooperation with the cylindrical part 11, and includes an inner wall surface 12a that functions as a stopper defining a rest position of the mover 80.

In order to be fitted into a first positioning part 34 as a protrusion of the bobbin 30, the outer peripheral fitting part 13 is formed as a cylindrical outer peripheral surface having the same outer diameter as the outer peripheral surface 11b and centered on the axis line S near a tip side of the cylindrical part 11.

The flange 14 functions as a stator side receiving part that receives the annular seal member $Sr_1$ as a first annular seal member in the axis line S direction, and is formed in an annular plate shape extending from the outer periphery of the cylindrical part 11 in the radial direction perpendicular to the axis line S. The flange 14 includes, in an outer edge area, four notches 14a, and a joint surface 14b to which the cylindrical member 60 is joined.

The flange 14 covers the bobbin module Bm in cooperation with the cylindrical member 60, is joined to the cylindrical member 60 and is fixed by crimping.

The second stator 20 is formed by machining or forging using soft iron or the like, functions as a magnetic path through which a line of magnetic force passes, and also functions as a fixed iron core that attracts the plunger 81 of the mover 80 when the coil 40 is energized. As shown in FIG. 3 to FIG. 5, FIG. 10, and FIG. 11, the second stator 20 includes a recess 21, an insertion hole 22, an outer peripheral surface 23, an outer peripheral fitting part 24, a collar 25, a fitting part 26 and a fitting part 27.

The recess 21 is an area receiving the plunger 81 of the mover 80 that moves to an operating position, and defines an inner peripheral surface 21a of a cylindrical shape centered on the axis line S and a stopper 21b forming a flat surface perpendicular to the axis line S.

In order to receive, in a non-contact manner, the plunger 81 of the mover 80 that moves to the operating position, the inner peripheral surface 21a is formed to have a larger inner diameter than a tip side outer diameter part 81b of the plunger 81.

The stopper 21b is formed as a separate member subjected to hardening processing such as carburizing, and is then fitted and fixed. An end face 81c of the plunger 81 is brought into contact with the stopper 21b and the operating position is defined. In order to slidably guide a shaft 82 of the mover 80 in the axis line S direction, a guide hole 21c forming a cylindrical hole centered on the axis line S is formed in the stopper 21b.

In this way, by adopting the stopper 21b that has been subjected to hardening processing, abrasion resistance and mechanical strength against collision of the plunger 81 can be increased compared to a case where the stopper 21b is made of a material such as soft iron, and the cost can be reduced compared to a case where the entire second stator 20 is subjected to hardening processing.

The insertion hole 22 is formed as a cylindrical hole centered on the axis line S, allows the shaft 82 of the mover 80 to be inserted therethrough and to reciprocate in a non-contact manner in the axis line S direction, and exposes at a tip thereof the shaft 82 of the mover 80 that exerts a driving force to the outside.

A bearing B is fitted into the insertion hole 22 near the tip side of the insertion hole 22. The bearing B is a bush formed in a cylindrical shape using a hard metal material, and defines a guide hole $B_1$ that slidably guides the shaft 82 of the mover 80 in the axis line S direction.

The outer peripheral surface 23 is a cylindrical surface centered on the axis line S, and is formed to have an outer diameter smaller than an inner diameter of an inner wall surface 33a of a second through hole 33 of the bobbin 30 and a second positioning part 35. That is, the outer peripheral surface 23 is formed to be insertable into the second through hole 33 without contacting the inner wall surface 33a and the second positioning part 35, and is formed to face the inner wall surface 33a in an area deviated from the second positioning part 35.

An annular groove 23a and an outer peripheral annular tapered surface 23b are formed on the outer peripheral surface 23.

That is, from the other end opening $h_2$ of the bobbin 30 toward a back side within a through hole h in the axis line S direction, the outer peripheral fitting part 24, the annular groove 23a, and the outer peripheral annular tapered surface 23b are formed to be arranged side by side in this order. In an area of the second through hole 33 of the bobbin 30, the annular groove 23a is formed in order for the annular seal member $Sr_2$ as a second annular seal member to be fitted therein.

The outer peripheral annular tapered surface 23b is formed in a conical shape that tapers toward the cylindrical part 11 of the first stator 10 about the axis line S. The outer peripheral annular tapered surface 23b serves to guide a line of magnetic force generated when the coil 40 is energized in a streamlined manner in the axis line S direction of the second stator 20 after the line of magnetic force passes through from the cylindrical part 11 of the first stator 10 to the plunger 81 of the mover 80.

Outside the outer peripheral surface 23 in the axis line S direction, in order to be fitted into the second positioning part 35 of the bobbin 30, the outer peripheral fitting part 24 is formed as a cylindrical outer peripheral surface having a slightly larger outer diameter than the outer peripheral surface 23 and centered on the axis line S.

The annular seal member $Sr_2$ is an O-ring made of a rubber material, is fitted into the annular groove 23a, and is interposed between the bobbin 30 and the second stator 20 in the radial direction perpendicular to the axis line S.

The annular seal member $Sr_2$ is interposed between a spatial area where the outer peripheral fitting part 24 and the second positioning part 35 are located and a spatial area where the outer peripheral annular tapered surface 23b is located, and cuts off communication between the two spatial areas.

The collar 25 is formed as an annular part having a larger outer diameter than the outer peripheral fitting part 24, and defines an annular end face 25a and an annular end face 25b. An annular joint surface 72 of the flat plate member 70 is joined to the annular end face 25a. The annular end face 25b faces an annular tapered surface 33b of the bobbin 30 in a non-contact manner in the axis line S direction.

The fitting part 26 is formed as a cylindrical outer peripheral surface centered on the axis line S in order for a central hole 71 of the flat plate member 70 to be closely fitted therein.

The fitting part 27 is formed to be fitted into a fitting recess of the application object, includes an annular groove 27a on an outer peripheral surface thereof, and includes a recess 27b having a larger inner diameter than the insertion hole 22 on an inside thereof. The annular seal member $Sr_3$ is fitted into the annular groove 27a.

The annular seal member $Sr_3$ is an O-ring made of a rubber material, is fitted into the annular groove 27a, and is interposed between the application object and the second stator 20 in a direction perpendicular to the axis line S.

Figure 6:
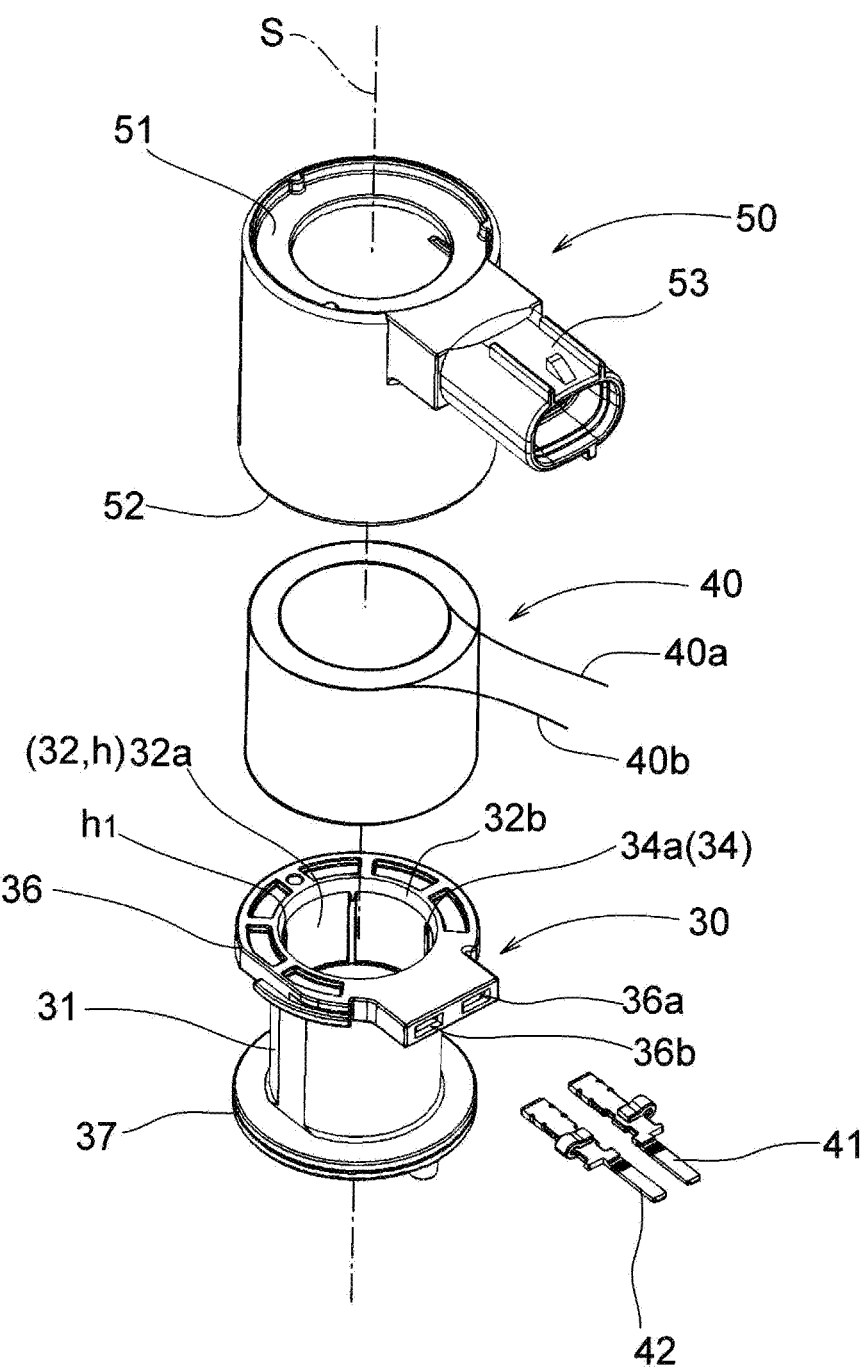
FIG. 6 is an exploded perspective view of a bobbin module (bobbin, coil for excitation, outer cover member, and terminal) included in the electromagnetic actuator according to an embodiment.

As shown in FIG. 6, the bobbin module Bm includes the bobbin 30, the coil 40 for excitation, the terminals 41 and 42, and the outer cover member 50.

Figure 7:
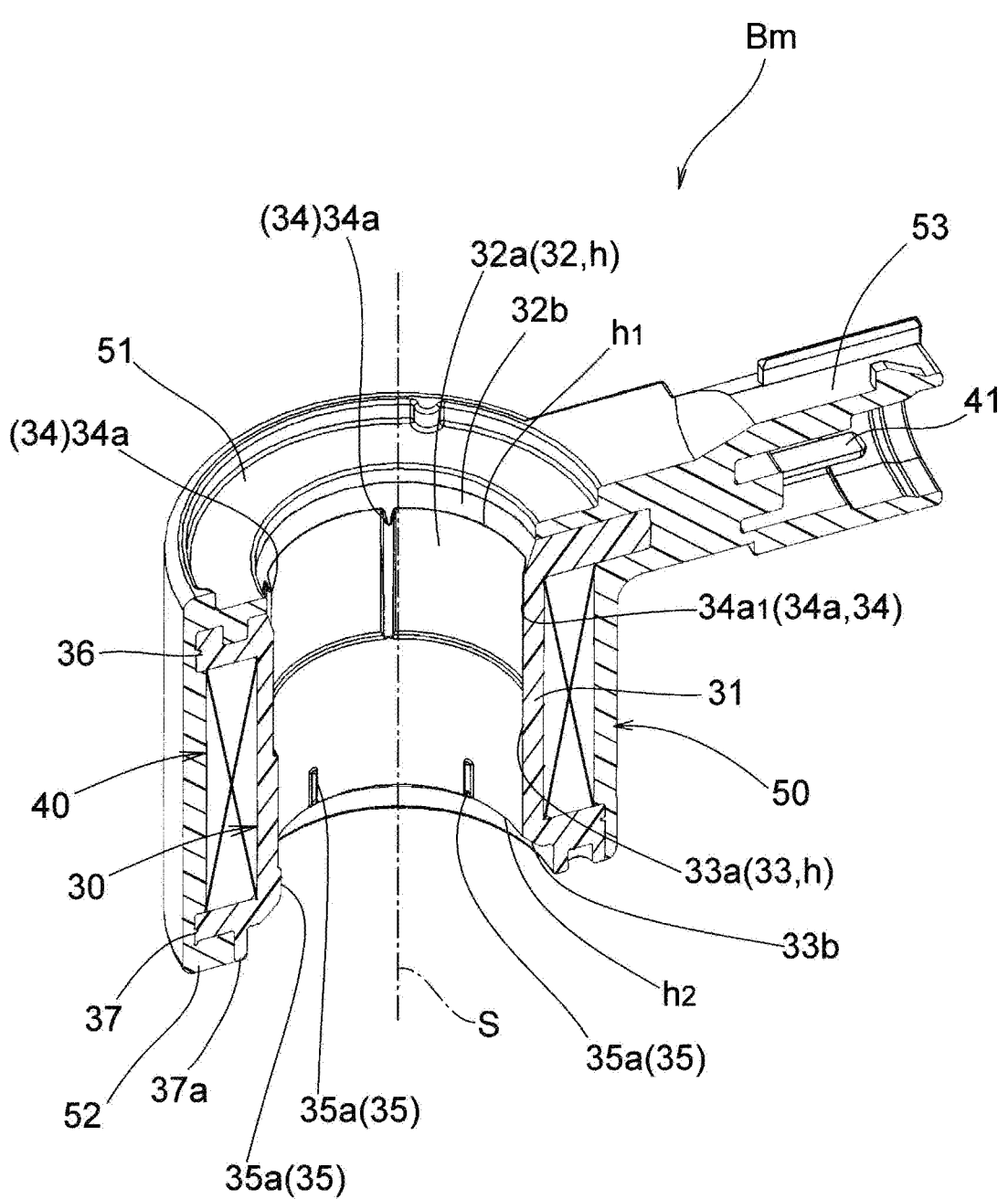
FIG. 7 is a perspective cross-sectional view of the bobbin module included in the electromagnetic actuator according to an embodiment.
Figure 8:
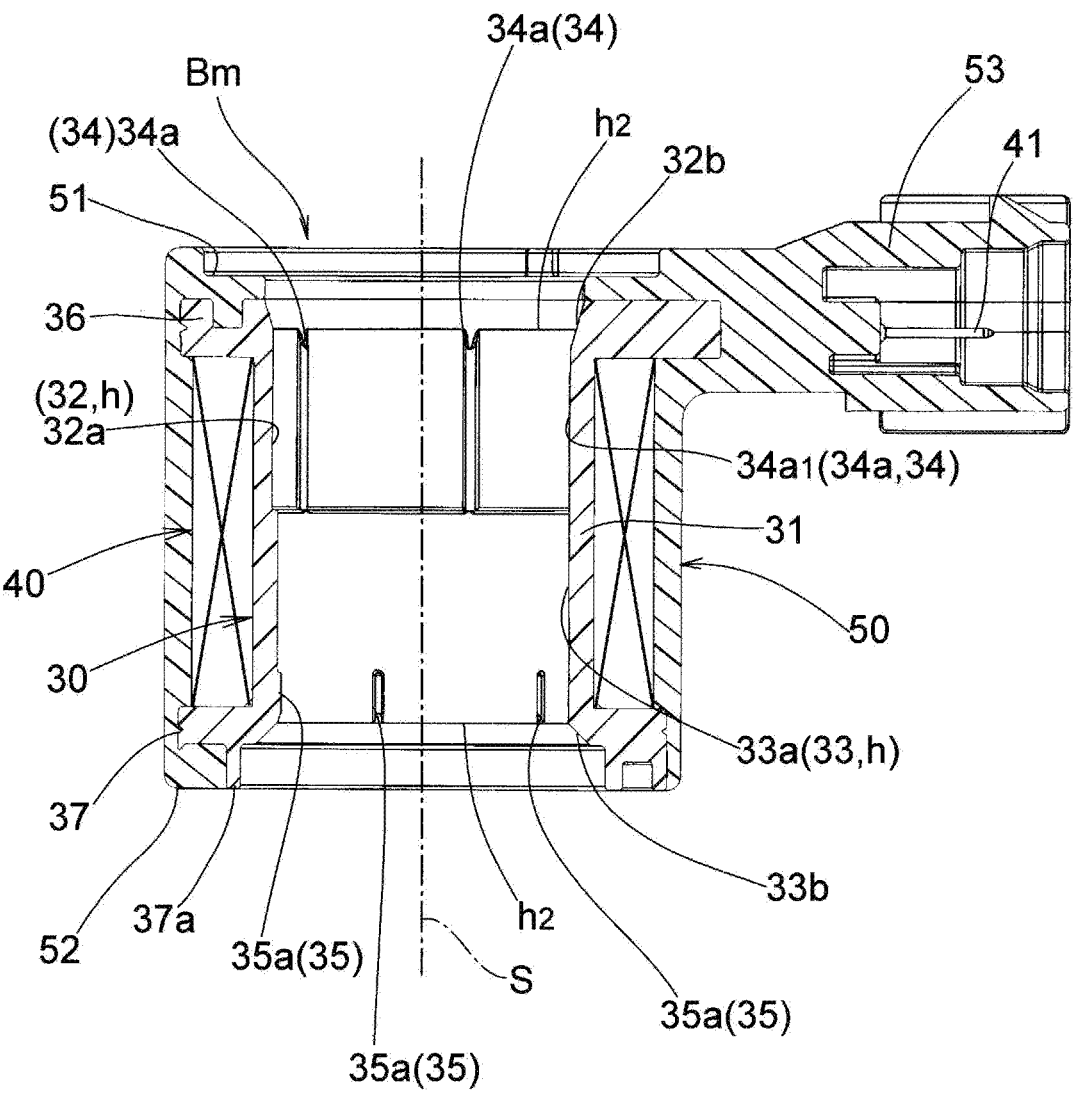
FIG. 8 is a cross-sectional view of the bobbin module included in the electromagnetic actuator according to an embodiment, taken along a plane including the axis line.
Figure 9:
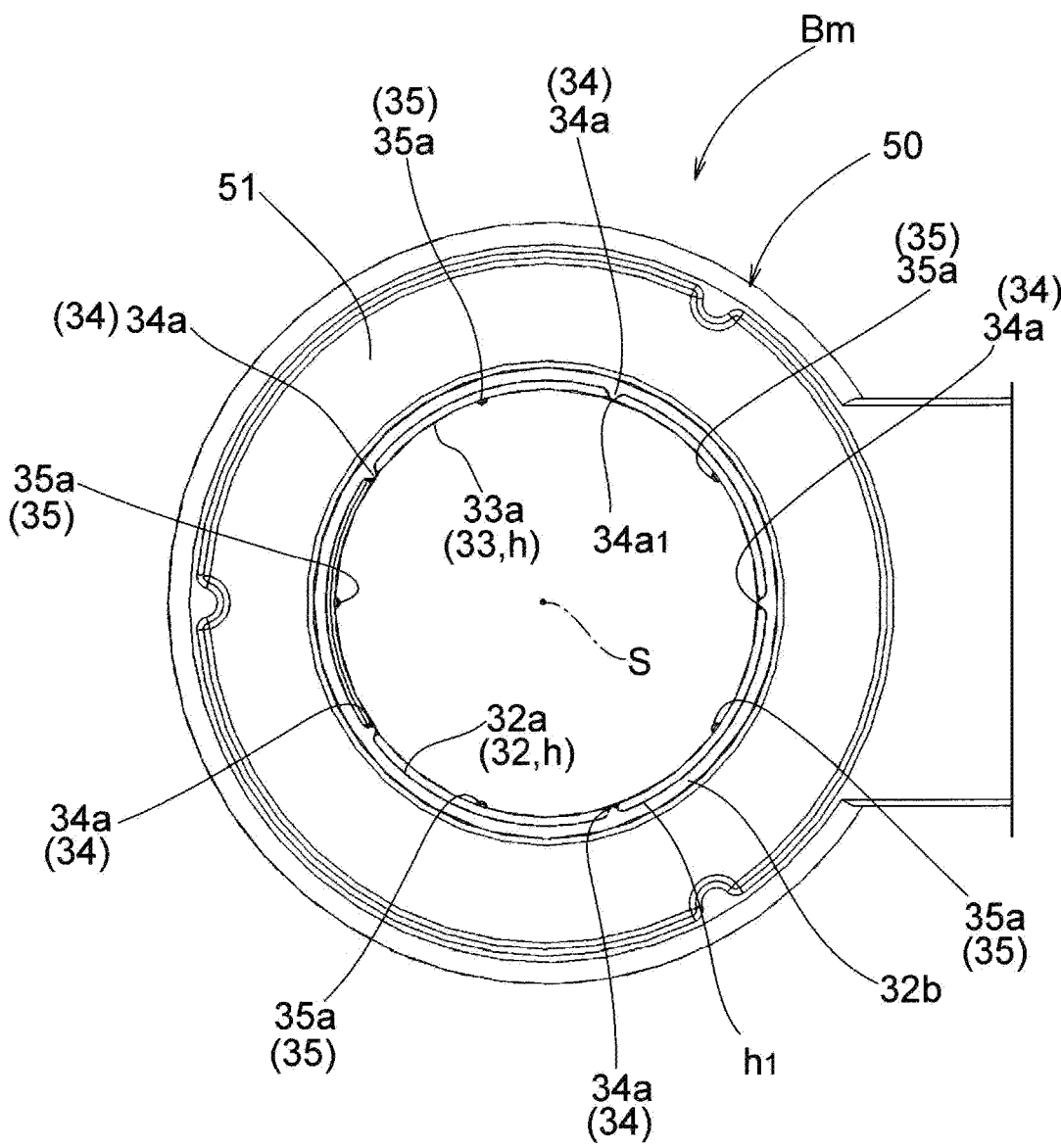
FIG. 9 is an end view of the bobbin module included in the electromagnetic actuator according to an embodiment as seen from one side in the axis line direction.
Figure 10:
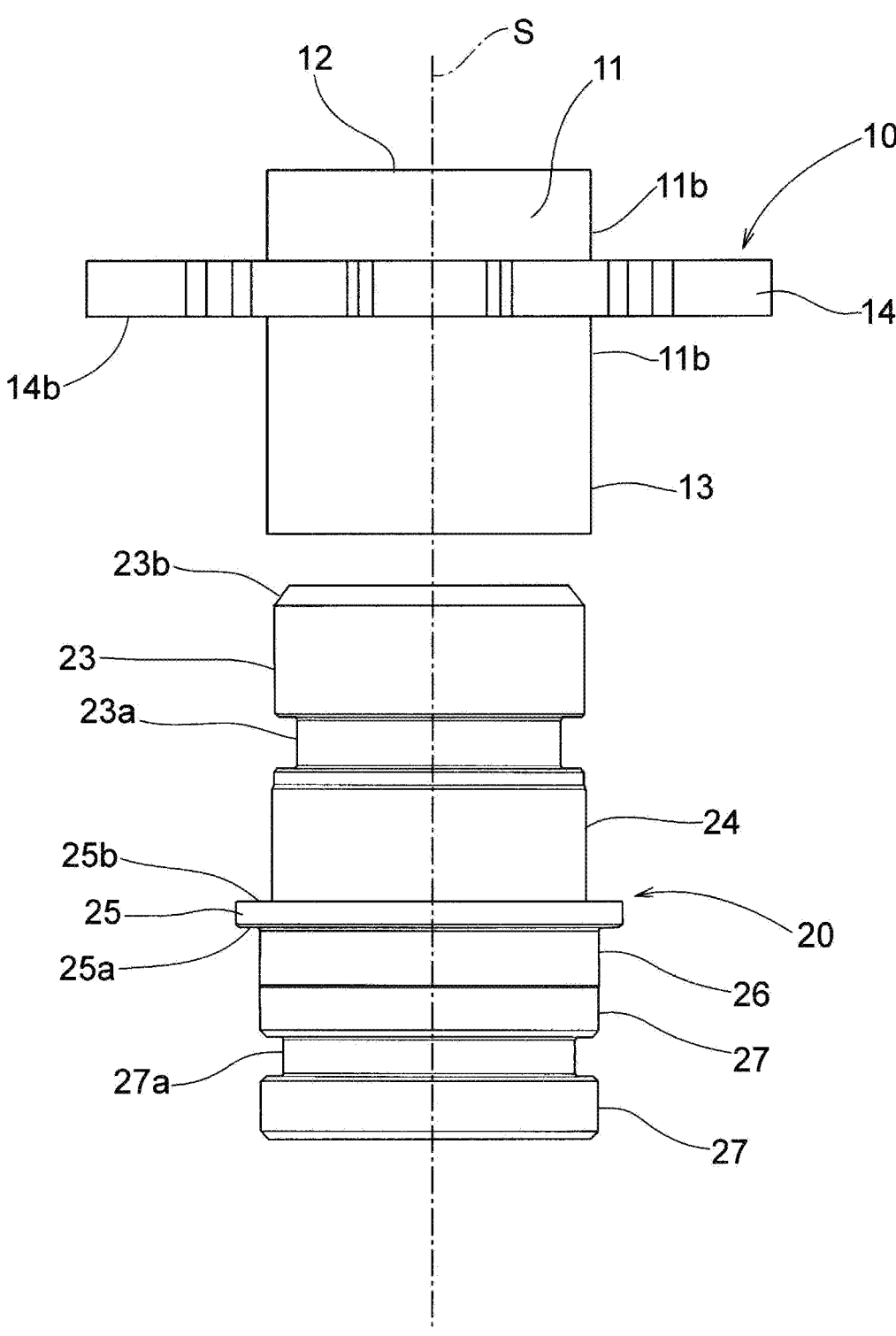
FIG. 10 is a side view showing a stator (first stator and second stator) included in the electromagnetic actuator according to an embodiment.
Figure 11:
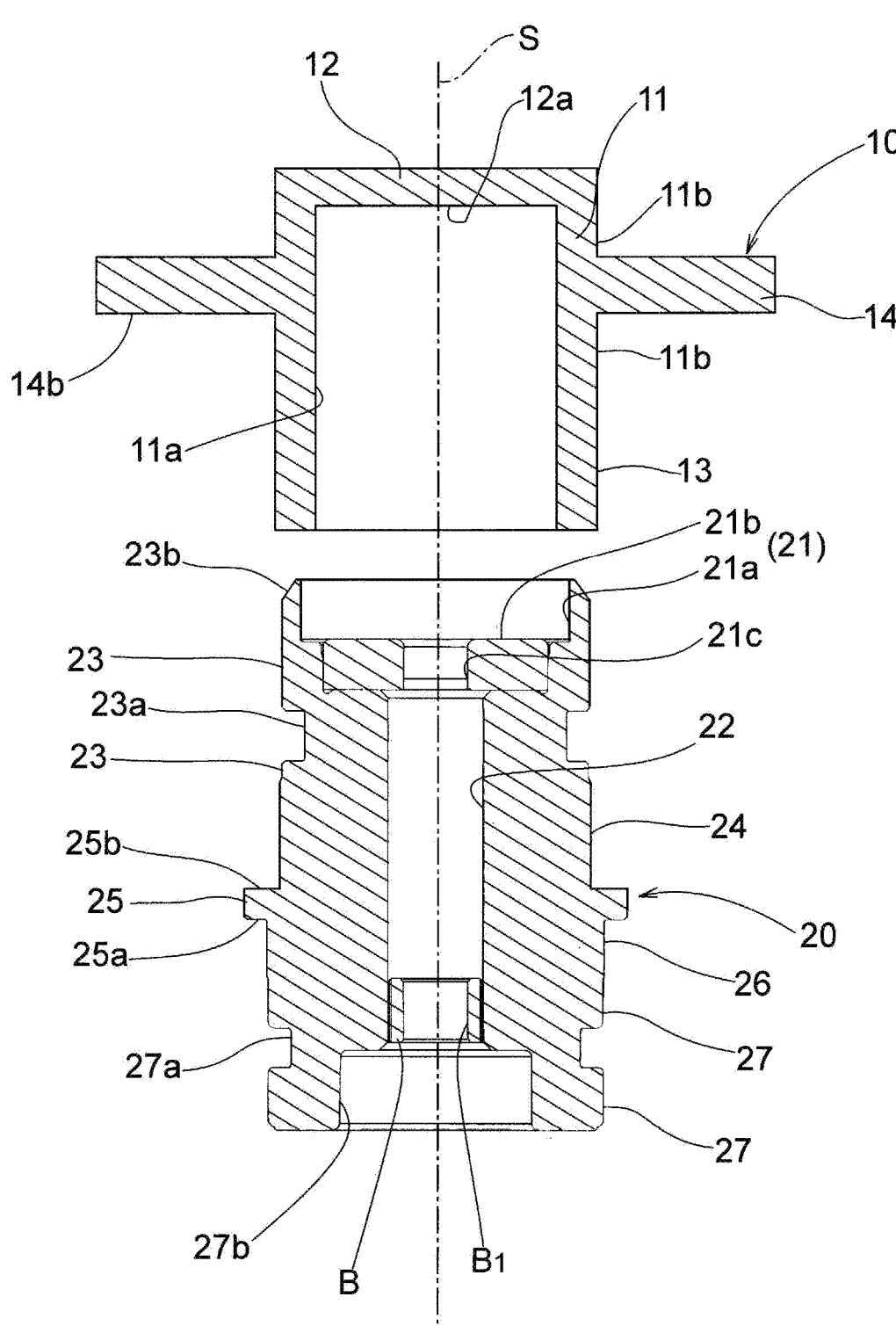
FIG. 11 is a cross-sectional view of the stator (first stator and second stator) shown in FIG. 10, taken along a plane including the axis line.

The bobbin 30 is made of a resin material. As shown in FIG. 7 to FIG. 9, the bobbin 30 includes: a cylindrical part 31 centered on the axis line S; the first through hole 32 and the second through hole 33 as the through hole h; the first positioning part 34 as the protrusion; the second positioning part 35; a flange 36; and a flange 37.

The cylindrical part 31 holds the coil 40 wound on an outside thereof.

The first through hole 32 defines an inner wall surface 32a of a cylindrical shape centered on the axis line S, and the annular tapered surface 32b. The first through hole 32 is formed to allow the cylindrical part 11 and the outer peripheral fitting part 13 of the first stator 10 to pass therethrough in a non-contact manner.

The annular tapered surface 32b is formed so as to form a portion of a conical surface that tapers toward the center of the interior of the through hole h about the axis line S in an inner peripheral area of one end opening $h_1$ of the through hole h.

The second through hole 33 is adjacent to the first through hole 32 in the axis line S direction and defines the inner wall surface 33a and the annular tapered surface 33b, the inner wall surface 33a having a cylindrical shape centered on the axis line S and having an inner diameter smaller than that of the inner wall surface 32a of the first through hole 32. The second through hole 33 is formed to allow the outer peripheral surface 23 and the outer peripheral fitting part 24 of the second stator 20 to pass therethrough in a non-contact manner.

The annular tapered surface 33b is formed so as to form a portion of a conical surface that tapers toward the center of the interior of the through hole h about the axis line S in an inner peripheral area of the other end opening $h_2$ of the through hole h.

Near the one end opening $h_1$ of the through hole h, that is, in an area of the first through hole 32 and an area deviated from the annular tapered surface 32b, the first positioning part 34 is formed as a plurality of (here, five) ridges 34a that protrude radially inward from the inner wall surface 32a, extend in the axis line S direction, and are arranged at equal intervals in a circumferential direction. The first positioning part 34 is formed so that a protruding end 34a1 thereof is flush with the inner wall surface 33a of the second through hole 33.

The first positioning part 34 allows the outer peripheral fitting part 13 of the first stator 10 to be fitted therein, thereby positioning the first stator 10 on the axis line S, that is, aligning a center line of the inner peripheral surface 11a on the axis line S.

In this way, since the first positioning part 34 is formed as the plurality of ridges 34a that protrude from the inner wall surface 32a of the through hole h (first through hole 32) and extend in the axis line S direction, fitting work can be relatively smoothly performed.

Near the other end opening $h_2$ of the through hole h, that is, in the area of the second through hole 33 and an area near the other end opening $h_2$, the second positioning part 35 is formed as a plurality of (here, five) ridges 35a that protrude radially inward from the inner wall surface 33a, extend in the axis line S direction, and are arranged at equal intervals in the circumferential direction.

The second positioning part 35 allows the outer peripheral fitting part 24 of the second stator 20 to be fitted therein, thereby positioning the second stator 20 on the axis line S, that is, aligning center lines of the inner peripheral surface 21a, the insertion hole 22, and the guide holes 21c and $B_1$ on the axis line S.

In this way, since the second positioning part 35 is formed as the plurality of ridges 35a that protrude from the inner wall surface 33a of the through hole h (second through hole 33) and extend in the axis line S direction, fitting work can be relatively smoothly performed.

The flange 36 is formed in an annular plate shape centered on the axis line S, and is arranged to face the flange 14 of the first stator 10 with the outer cover member 50 interposed therebetween. The flange 36 includes fitting holes 36a and 36b into which the terminals 41 and 42 respectively connecting ends 40a and 40b of the coil 40 are fitted.

The flange 37 is formed in an annular plate shape centered on the axis line S, and is arranged to face the flat plate member 70 with the outer cover member 50 interposed therebetween. The flange 37 includes a protruding cylindrical part 37a centered on the axis line S in order to directly contact the flat plate member 70.

The coil 40 is an excitation solenoid that generates magnetic force by being energized. The coil 40 is wound around the cylindrical part 31 of the bobbin 30, and has the ends 40a and 40b thereof pulled out from the wound portion and connected to the two terminals 41 and 42, respectively.

The outer cover member 50 is obtained in the following manner. A module product in which the coil 40 is wound around the bobbin 30 and the terminals 41 and 42 are connected to the ends 40a and 40b, while being arranged within a mold, is subjected to molding (insert molding) using a resin material so that the entire module product is covered. The outer cover member 50 includes an annular receiving part 51 as a bobbin side receiving part, an annular end 52, and a connector 53.

The annular receiving part 51 is formed so that the annular seal member $Sr_1$ as the first annular seal member is arranged on one end side in the axis line S direction, that is, adjacent to an outer side of the one end opening $h_1$ of the through hole h.

The annular seal member $Sr_1$ is an O-ring made of a rubber material, is fitted into the annular receiving part 51, and is interposed between the outer cover member 50 that forms a portion of the bobbin module Bm and the flange 14 of the first stator 10 in the axis line S direction.

The annular end 52 is formed to contact the flat plate member 70 on the other end side in the axis line S direction. The connector 53 is formed to surround the terminals 41 and 42 and expose the terminals 41 and 42 inside.

The cylindrical member 60 functions as a magnetic path through which a line of magnetic force passes, surrounds the bobbin module Bm, and is formed into a cylindrical shape centered on the axis line S by machining such as cutting and rolling using an iron plate made of soft iron or the like.

As shown in FIG. 1 to FIG. 5, the cylindrical member 60 includes: a connecting part 61; an arc-shaped end face 62; four crimping pieces 63, a notch 64 on one end side in the axis line S direction; and an annular end face 65 on the other end side in the axis line S direction.

The connecting part 61 is obtained by subjecting an iron plate piece which has been cut into a predetermined shape in advance to rolling into a cylindrical shape, and then engaging a concave part with a convex part and connecting them into a puzzle shape.

The arc-shaped end face 62 is an area to which the joint surface 14b of the flange 14 included in the first stator 10 is closely joined.

The crimping piece 63 is crimped by pressing the flange 14 of the first stator 10 from the outside with the flange 14 joined to the arc-shaped end face 62.

The notch 64 is formed in a rectangular shape in order to expose the connector 53 of the bobbin module Bm.

The annular end face 65 is an area closely joined to an annular joint surface 73 of the flat plate member 70.

In a state in which the joint surface 14b of the flange 14 of the first stator 10 is joined to the arc-shaped end face 62, the cylindrical member 60 is fixed to the first stator 10 by the crimping piece 63 being crimped. That is, the cylindrical member 60 forms a magnetic path leading to the first stator 10 via the arc-shaped end face 62. Here, since the cylindrical member 60 is formed by cutting and rolling or the like, the cost can be reduced compared to cutting and forging or the like.

The flat plate member 70 is formed by machining such as cutting using an iron plate made of soft iron or the like to have a substantially diamond-shaped outline. As shown in FIG. 1 to FIG. 5, the flat plate member 70 includes: the central hole 71; the annular joint surface 72 located in a peripheral area of the central hole 71; the annular joint surface 73 located concentrically with the annular joint surface 72; and two circular holes 74 through which bolts for fastening pass.

The central hole 71 is formed as a circular hole centered on the axis line S, and has an inner diameter allowing the fitting part 26 of the second stator 20 to be closely fitted therein.

The annular joint surface 72 is closely joined to the annular end face 25a of the collar 25 of the second stator 20.

The annular joint surface 73 is closely joined to the annular end face 65 of the cylindrical member 60.

In the flat plate member 70, with the fitting part 26 of the second stator 20 fitted into the central hole 71 and the annular joint surface 72 joined to the annular end surface 25a, the peripheral area of the central hole 71 is subjected to laser welding and fixed to the second stator 20. In the flat plate member 70, with the annular joint surface 73 joined to the annular end face 65 of the cylindrical member 60, a peripheral area of the annular end face 65 is subjected to laser welding and fixed to the cylindrical member 60.

That is, the flat plate member 70 is interposed between the second stator 20 and the cylindrical member 60 and forms a magnetic path, and also serves as a flange member for attachment to the application object.

Here, since the cylindrical member 60 and the flat plate member 70 are separately formed and then integrally fixed by welding or the like, the cost can be reduced compared to a case where the cylindrical member 60 and the flat plate member 70 are integrally formed by cutting or forging or the like.

A shown in FIG. 4, FIG. 5, FIG. 12, and FIG. 13, the mover 80 includes the plunger 81, and the shaft 82 fixed to the plunger 81.

The plunger 81 functions as a magnetic path through which a line of magnetic force passes, and also functions as a movable iron core that moves in the axis line S direction when the coil 40 is energized. The plunger 81 is formed into a bottomed cylindrical shape by machining or forging using a magnetic material such as, for example, free-cutting steel (SUM).

The plunger 81 includes the outer peripheral surface 81a, the tip side outer diameter part 81b, the end face 81c, a fitting hole 81d, a guide inner wall surface 81e, a bottom wall 81f, and an opening 81g.

The outer peripheral surface 81a is a cylindrical surface centered on the axis line S, and faces the inner peripheral surface 11a of the first stator 10 with a predetermined gap therebetween.

The tip side outer diameter part 81b is formed to have the same outer diameter as the outer peripheral surface 81a, and faces the inner peripheral surface 21a with a predetermined gap therebetween while entering the recess 21 of the second stator 20.

The end face 81c is formed as an annular plane perpendicular to the axis line S, and contacts the stopper 21b of the second stator 20 at the operating position.

The fitting hole 81d is a cylindrical hole centered on the axis line S, and is formed so that a fitting part 82a of the shaft 82 is press-fitted therein.

The guide inner wall surface 81e is a cylindrical surface having the same inner diameter as the fitting hole 81d and centered on the axis line S, and slidably guides a rod 91 included in the buffer unit 90 in the axis line S direction.

The bottom wall 81f contacts a contact part 91c of the rod 91 included in the buffer unit 90 in the axis line S direction and prevents the contact part 91c from coming off.

The opening 81g is a circular hole centered on the axis line S, and allows a protrusion 91b of the rod 91 to protrude to the outside.

Here, since the plunger 81 is arranged in a non-contact manner with a gap with the inner peripheral surface 11a of the first stator 10, mutual attraction when the coil 40 is energized is suppressed or prevented, and smooth movement with excellent responsiveness can be achieved by attraction with the second stator 20.

The shaft 82 exerts a driving force on the application object, and is formed in a long columnar shape in the axis line S direction using a nonmagnetic material such as, for example, stainless steel. The shaft 82 includes the fitting part 82*a*, a shank 82*b*, a free end 82*c*, an end face 82*d*, and a receiving part 82*e*.

The fitting part 82*a* is an area fitted into the fitting hole 81*d* of the plunger 81, and is formed to have a larger outer diameter than the shank 82*b*.

The shank 82*b* extends in the axis line S direction, is inserted into the insertion hole 22 of the second stator 20 in a non-contact manner, and is slidably guided by the guide holes 21*c* and B₁ of the second stator 20.

The free end 82*c* is arranged to protrude outward from the insertion hole 22 of the second stator 20 and face the recess 27*b* at the rest position.

The end face 82*d* is arranged to face the inside of the plunger 81, and a buffer member 93 of the buffer unit 90 removably contacts the end face 82*d*.

The receiving part 82*e* is formed as an annular end face centered on the axis line S in order to receive one end 92*a* of an energization member 92.

As shown in FIG. 4, FIG. 5, FIG. 12, and FIG. 13, the buffer unit 90 is held by the plunger 81 of the mover 80, and positions the mover 80 in the rest position while absorbing impact when the mover 80 returns to the rest position. The buffer unit 90 includes the rod 91, the energization member 92, and the buffer member 93.

The rod 91 is made of stainless steel or the like, and includes a main body 91*a*, the protrusion 91*b*, the contact part 91*c*, a receiving part 91*d*, and a fitting part 91*e*.

The main body 91*a* is formed in a columnar shape centered on the axis line S in order to slidably contact the guide inner wall surface 81*e* of the plunger 81.

The protrusion 91*b* is arranged to protrude from the opening 81*g* of the plunger 81, and is formed in a columnar shape centered on the axis line S and having a smaller diameter than the main body 91*a* in order to removably contact the stopper (inner wall surface 12*a*) of the first stator 10.

The contact part 91*c* removably contacts the bottom wall 81*f* of the plunger 81 in the axis line S direction.

The receiving part 91*d* is formed as an annular end face centered on the axis line S in order to receive the other end 92*b* of the energization member 92.

The fitting part 91*e* is formed in a columnar shape centered on the axis line S in order to be fitted into a fitting recess 93*a* of the buffer member 93 and position the buffer member 93 in the direction perpendicular to the axis line S.

The energization member 92 is a compression type coil spring. The energization member 92 is compressed and arranged in the axis line S direction with the one end 92*a* in contact with the receiving part 82*e* of the shaft 82 and the other end 92*b* in contact with the receiving part 91*d* of the rod 91. The energization member 92 energizes the rod 91 to contact the bottom wall 81*f* in the axis line S direction.

That is, in the electromagnetic actuator that has been assembled, the energization member 92 energizes the rod 91 toward the first stator 10.

Here, an energizing force of the energization member 92 is set to be greater than a return force exerted by the application object. Accordingly, the energization member 92 resists the return force of the application object and positions the mover 80 in the predetermined rest position.

Figure 12:
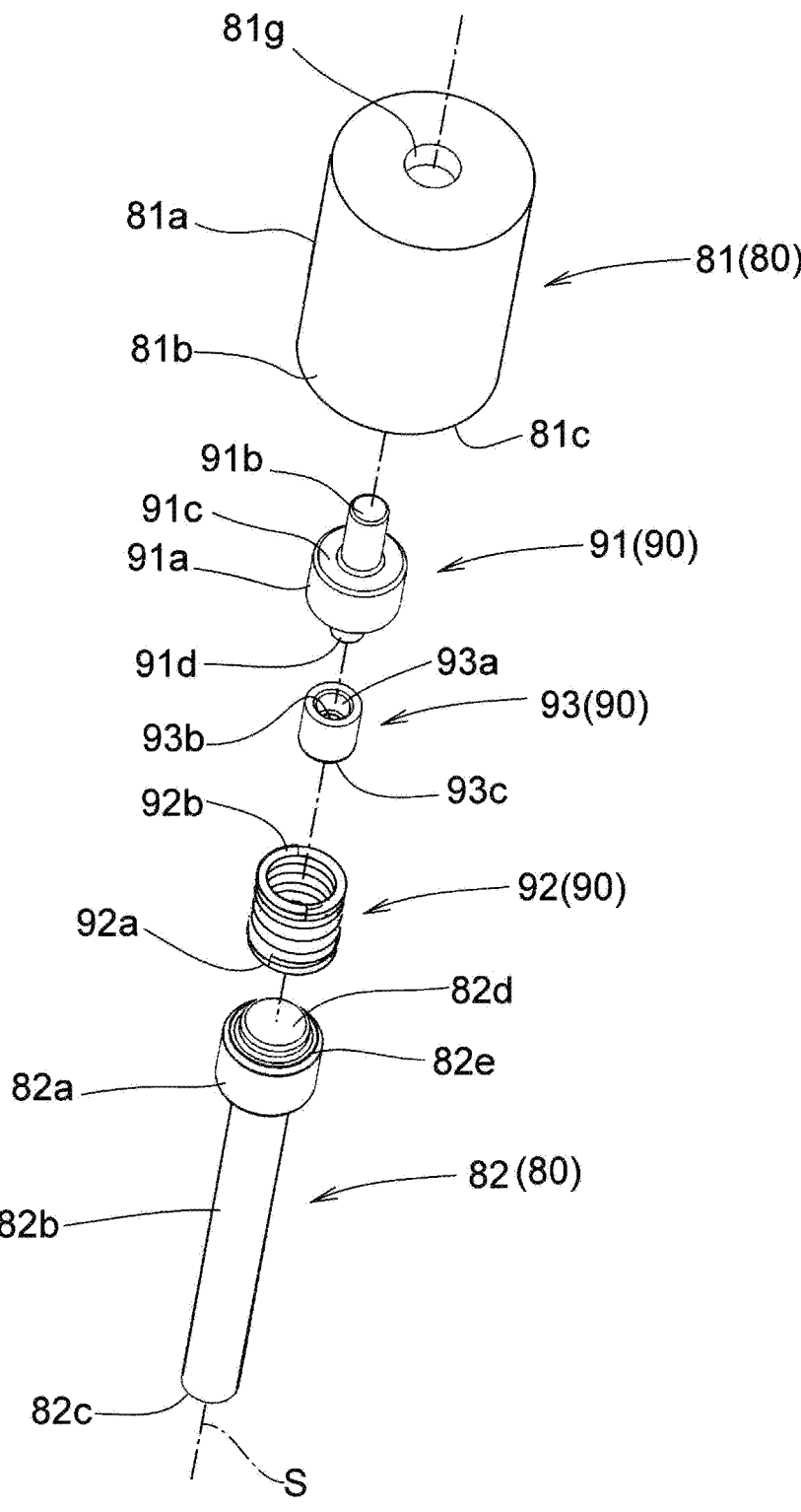
FIG. 12 is an exploded perspective view of a mover included in the electromagnetic actuator according to an embodiment.
Figure 13:
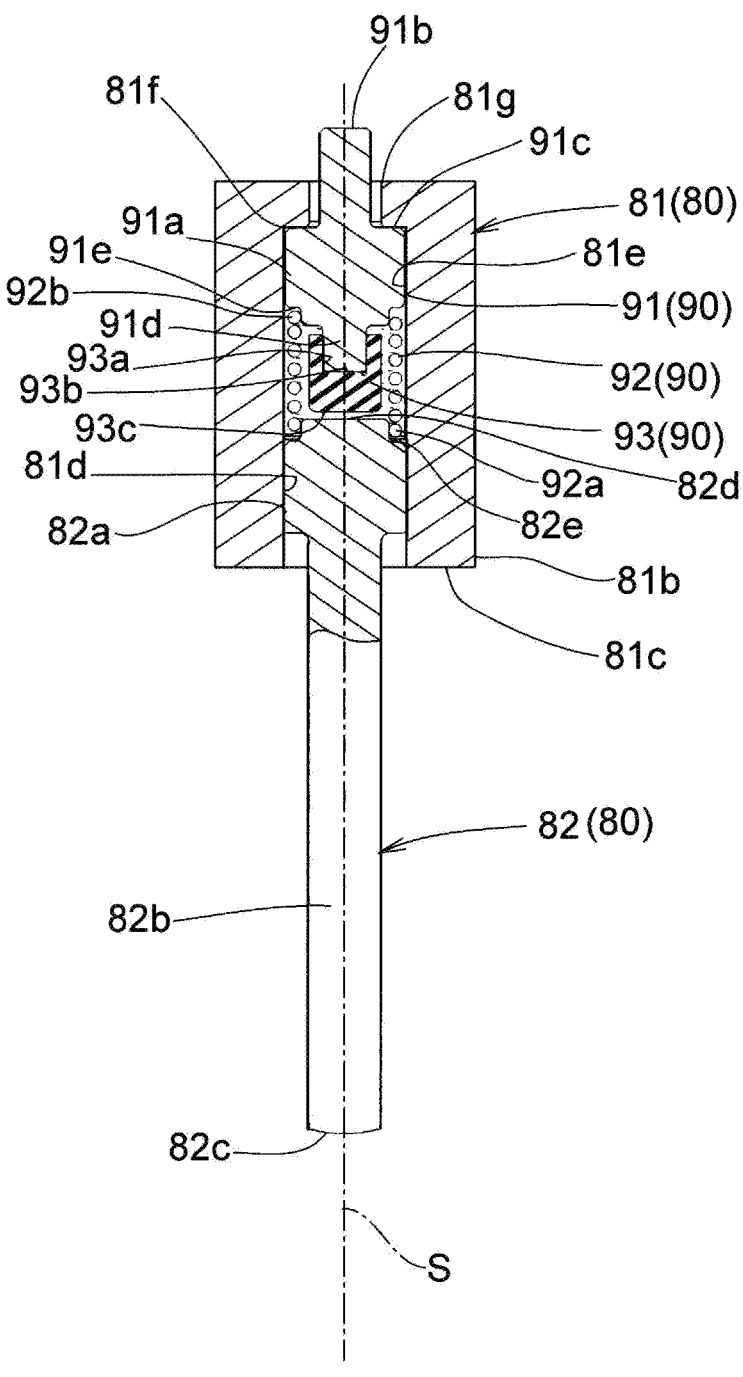
FIG. 13 is a cross-sectional view of the mover included in the electromagnetic actuator according to an embodiment, taken along a plane including the axis line.

The buffer member 93 is formed in a columnar shape using a material that can absorb impact, for example, a rubber material. As shown in FIG. 12 and FIG. 13, the buffer member 93 includes the fitting recess 93*a*, a bottom surface 93*b*, and an end face 93*c*.

The fitting recess 93*a* is formed so that the fitting part 91*e* of the rod 91 is fitted therein, and an end face of the fitting part 91*e* contacts the bottom surface 93*b*. In this way, in a state in which the buffer member 93 has been assembled to the rod 91 in advance by fitting the fitting part 91*e* into the fitting recess 93*a*, by inserting the buffer member 93 into the plunger 81 together with the rod 91, assembly work can be easily performed. The buffer member 93 can be positioned in the direction perpendicular to the axis line S, and interference with the energization member 92 can be prevented.

The end face 93*c* is formed as a plane perpendicular to the axis line S, and is arranged to face the end face 82*d* of the shaft 82.

In the assembled state, that is, in a rest state in which the mover 80 is located in the rest position, the buffer member 93 is arranged so that a slight gap is formed between the end face 93*c* and the end face 82*d*. This gap is for absorbing a dimensional error in manufacturing of the buffer member 93 or other members, and is able to achieve a desired buffering effect by preventing the buffer member 93 from being compressed in the rest state.

Next, the assembly work of the electromagnetic actuator is described.

First, the following work is performed on a sub-line.

The buffer unit 90 is incorporated into the plunger 81, the shaft 82 is press-fitted from the outside, and the mover 80 provided with the buffer unit 90 is formed.

The stopper 21*b* and the bearing B are incorporated into the second stator 20.

A module product in which the coil 40 is wound around the bobbin 30 and the terminals 41 and 42 are respectively connected to ends 40*a* and 40*b* of the coil 40 is arranged within a mold, the outer cover member 50 is molded by a resin material, and the bobbin module Bm is formed.

Figure 3:
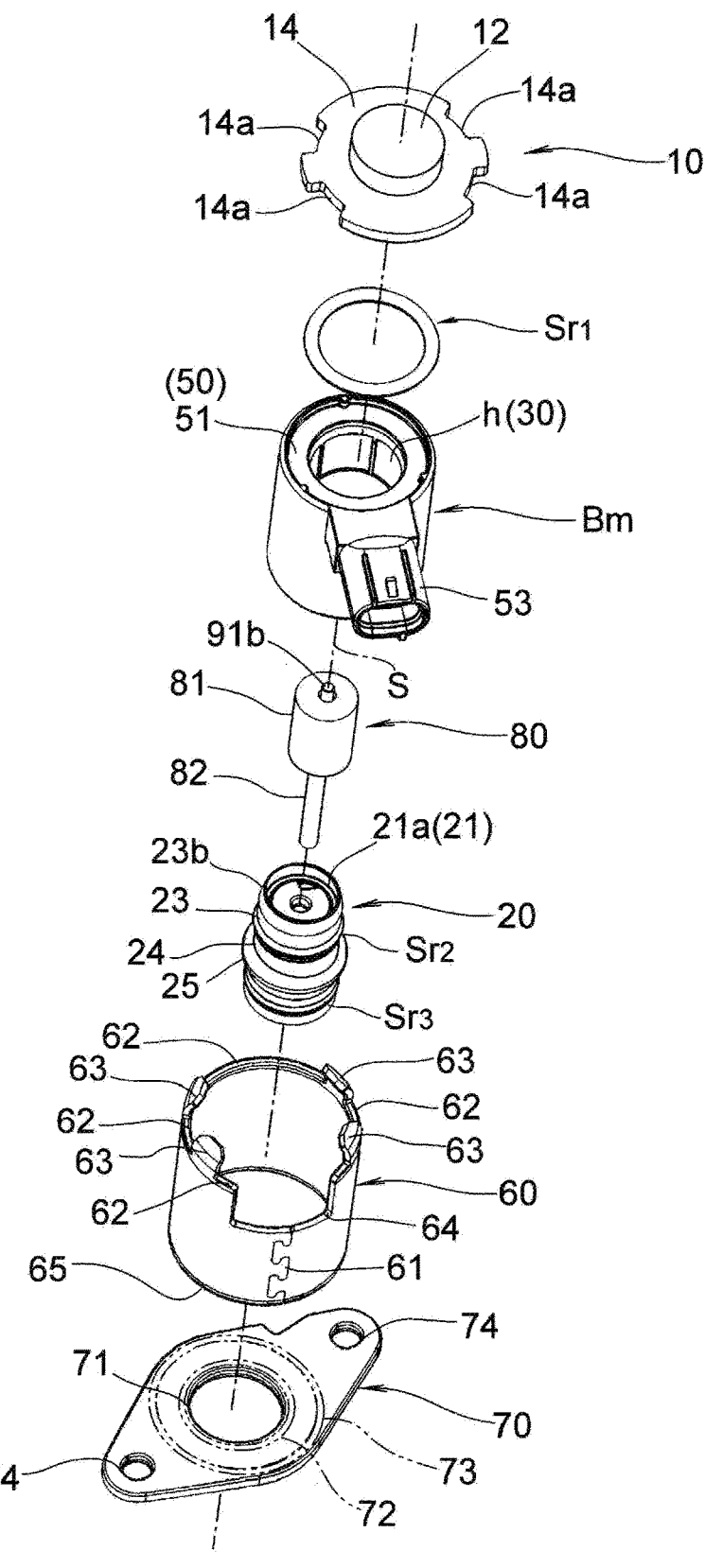
FIG. 3 is an exploded perspective view of the electro-magnetic actuator according to an embodiment.
Figure 4:
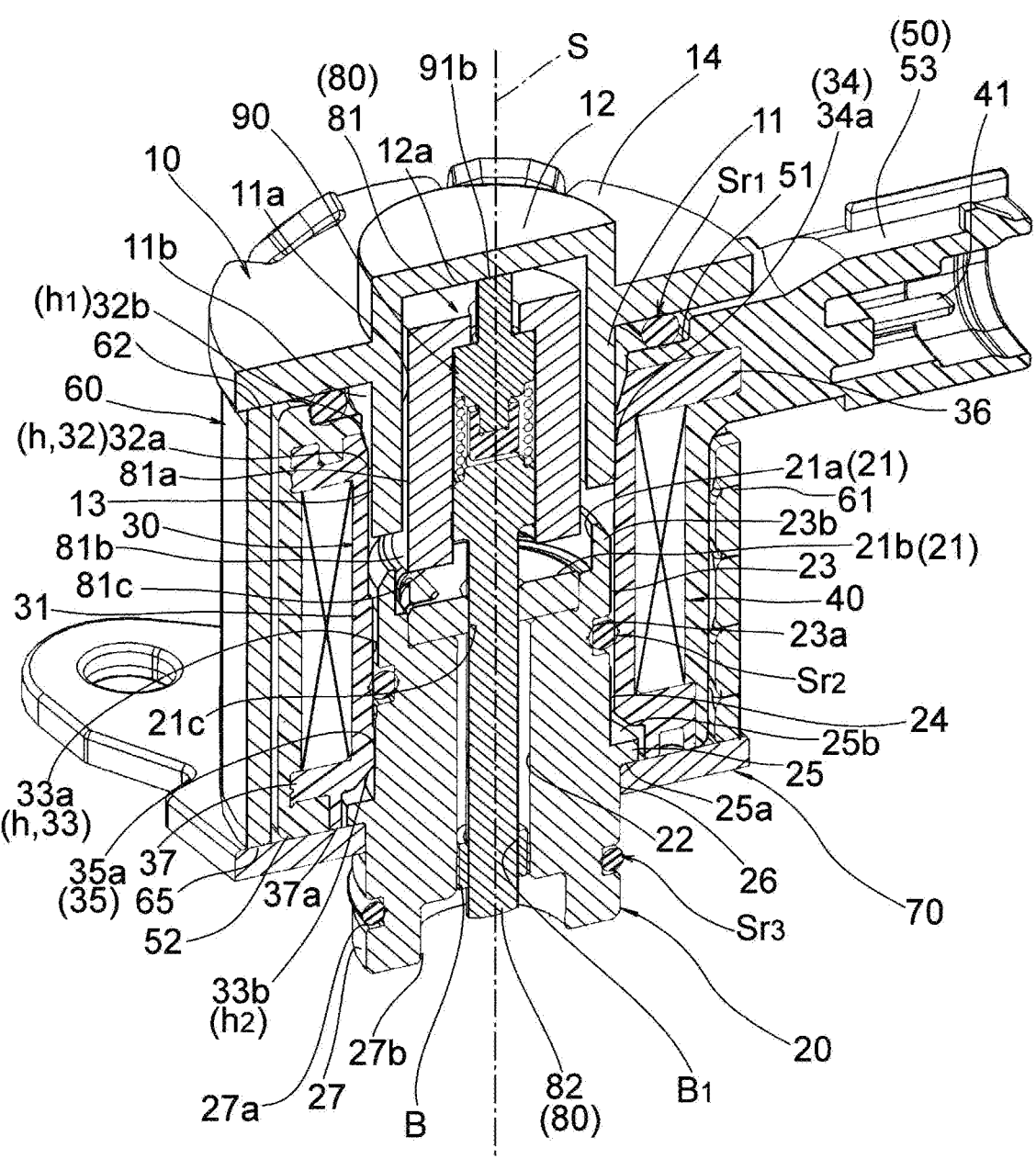
FIG. 4 is a perspective cross-sectional view of the elec-tromagnetic actuator according to an embodiment.
Figure 5:
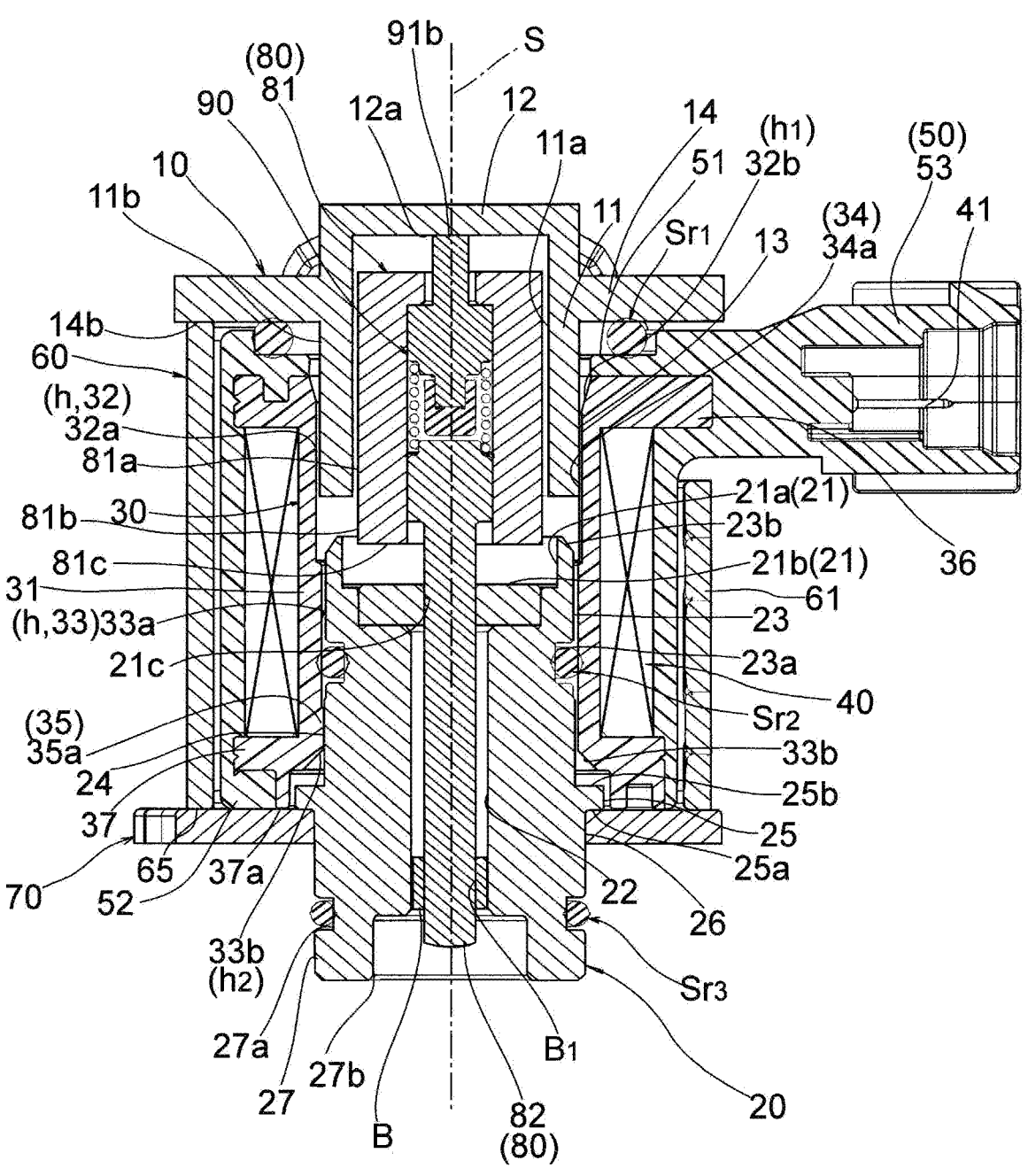
FIG. 5 is a cross-sectional view of the electromagnetic actuator according to an embodiment, taken along a plane including an axis line.

Next, on a main line, as shown in FIG. 3, the first stator 10, the second stator 20, the bobbin module Bm, the cylindrical member 60, the flat plate member 70, the mover 80, and the annular seal members Sr₁, Sr₂, and Sr₃ are prepared.

First, the flat plate member 70 is fixed to the second stator 20. That is, the fitting part 26 of the second stator 20 is fitted into the central hole 71 of the flat plate member 70, and the annular joint surface 72 is joined to the annular end face 25*a* of the collar 25. Then, laser welding is performed in a boundary area (peripheral area of the central hole 71) between the fitting part 26 and the central hole 71, and the flat plate member 70 is fixed to the second stator 20.

Subsequently, the cylindrical member 60 is fixed to the flat plate member 70. That is, the annular end face 65 of the cylindrical member 60 is joined to the annular joint surface 73 of the flat plate member 70. Then, laser welding is performed in a boundary area (peripheral area of the annular end face 65) between the annular end face 65 and the annular joint surface 73, and the cylindrical member 60 is fixed to the flat plate member 70.

Figure 14:
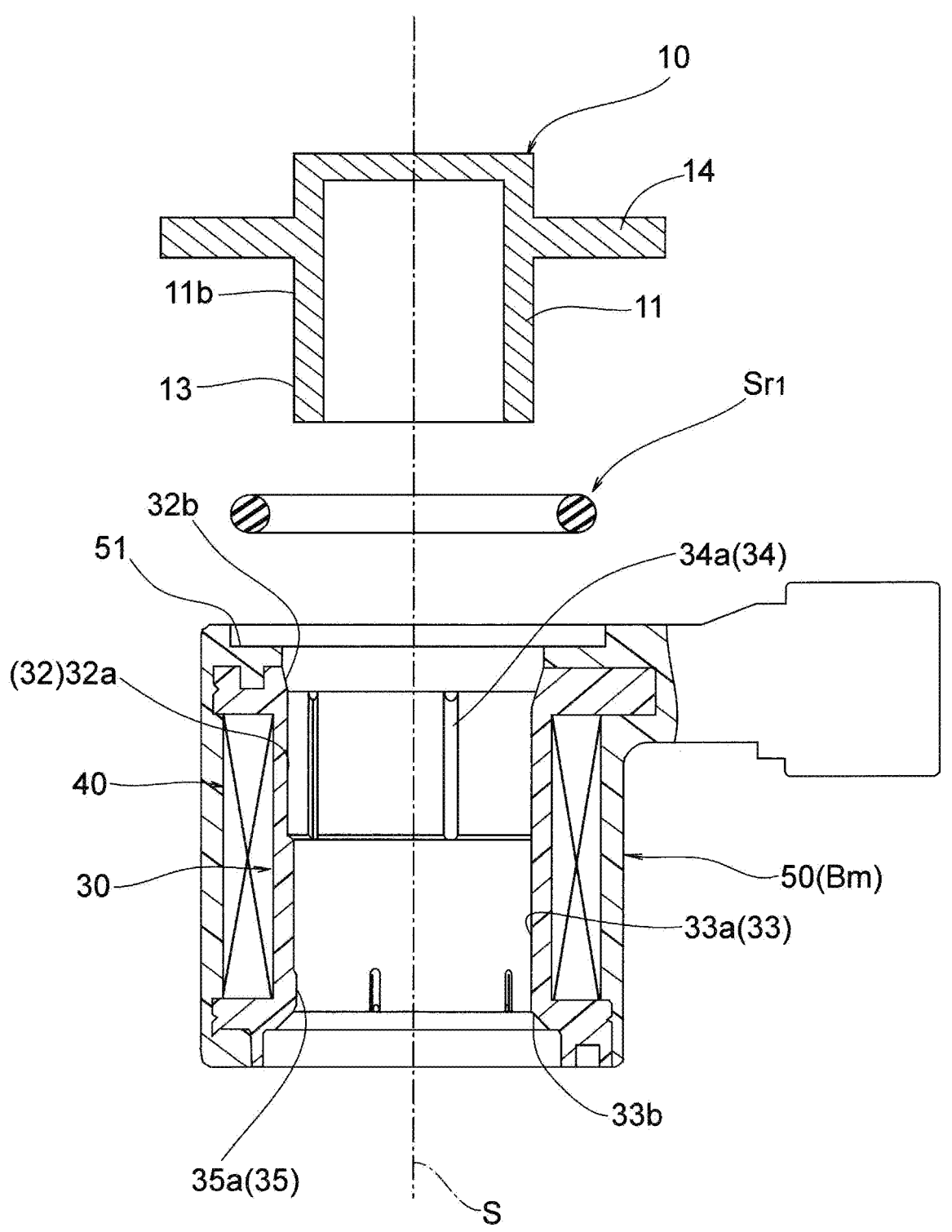
FIG. 14 is a process diagram showing assembly work of the first stator, a first annular seal member, and the bobbin module in the electromagnetic actuator according to an embodiment.
Figure 15:
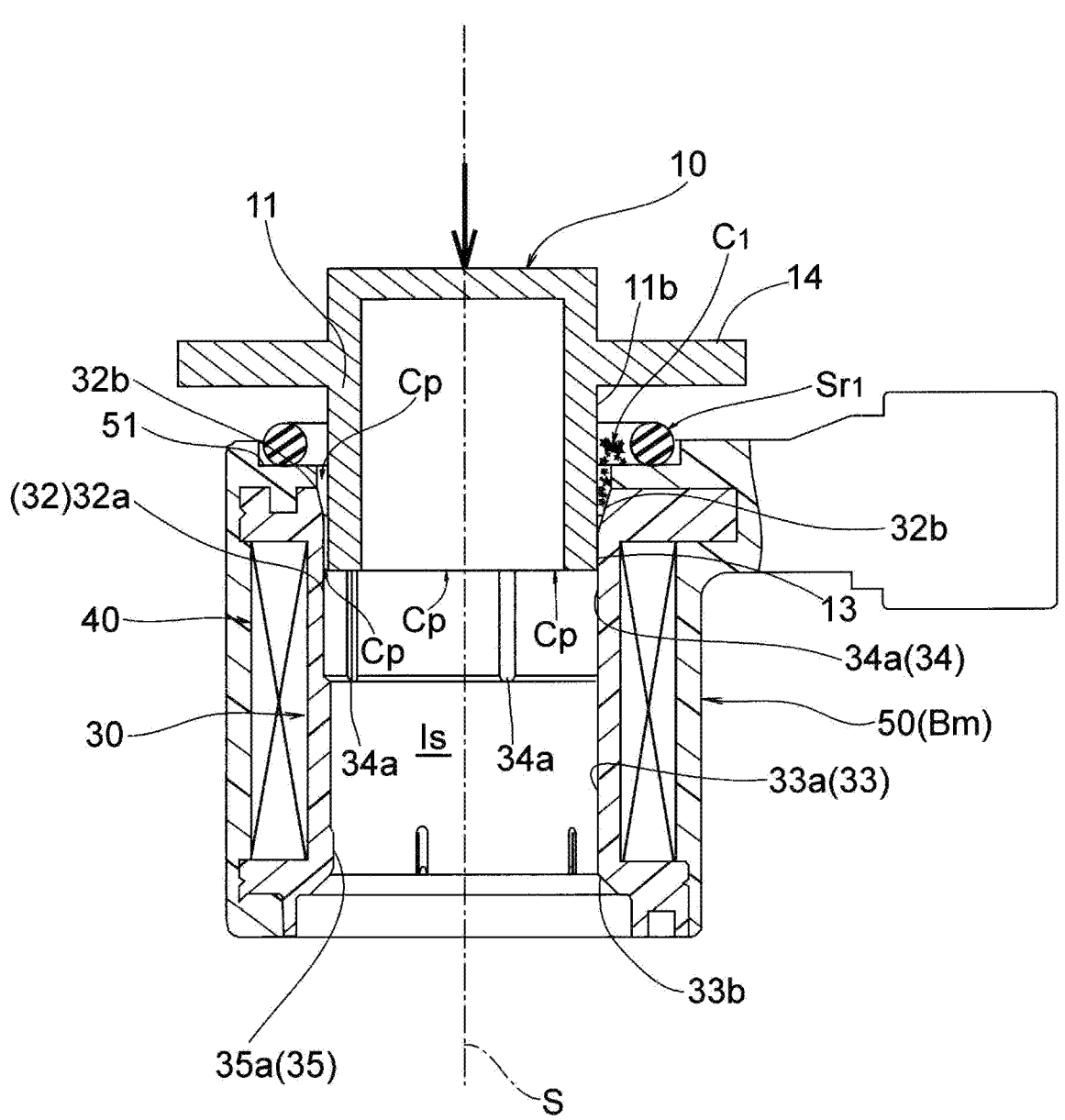
FIG. 15 is a process diagram showing assembly work of the first stator, the first annular seal member, and the bobbin module in the electromagnetic actuator according to an embodiment.
Figure 16:
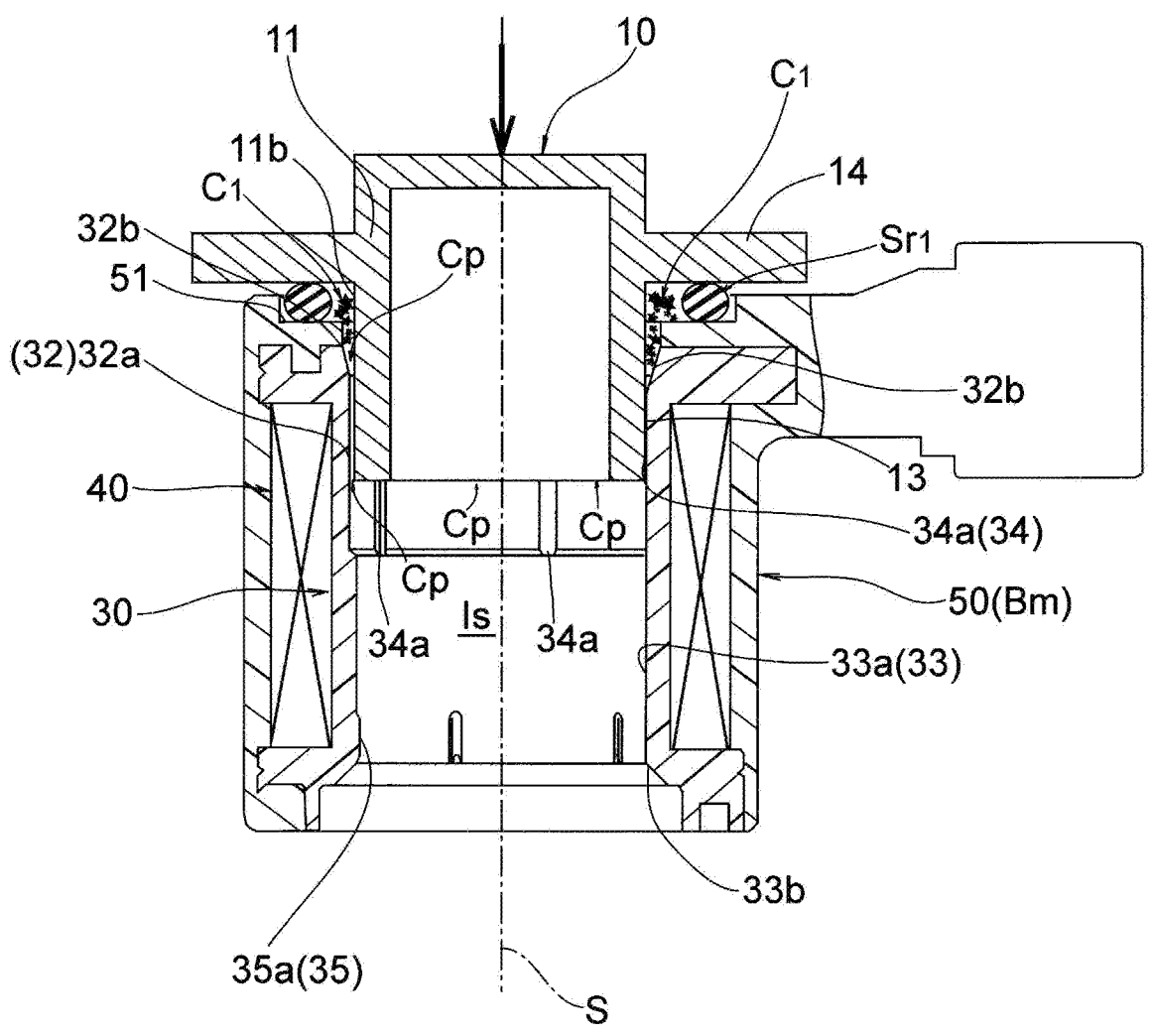
FIG. 16 is a process diagram showing assembly work of the first stator, the first annular seal member, and the bobbin module in the electromagnetic actuator according to an embodiment.
Figure 17:
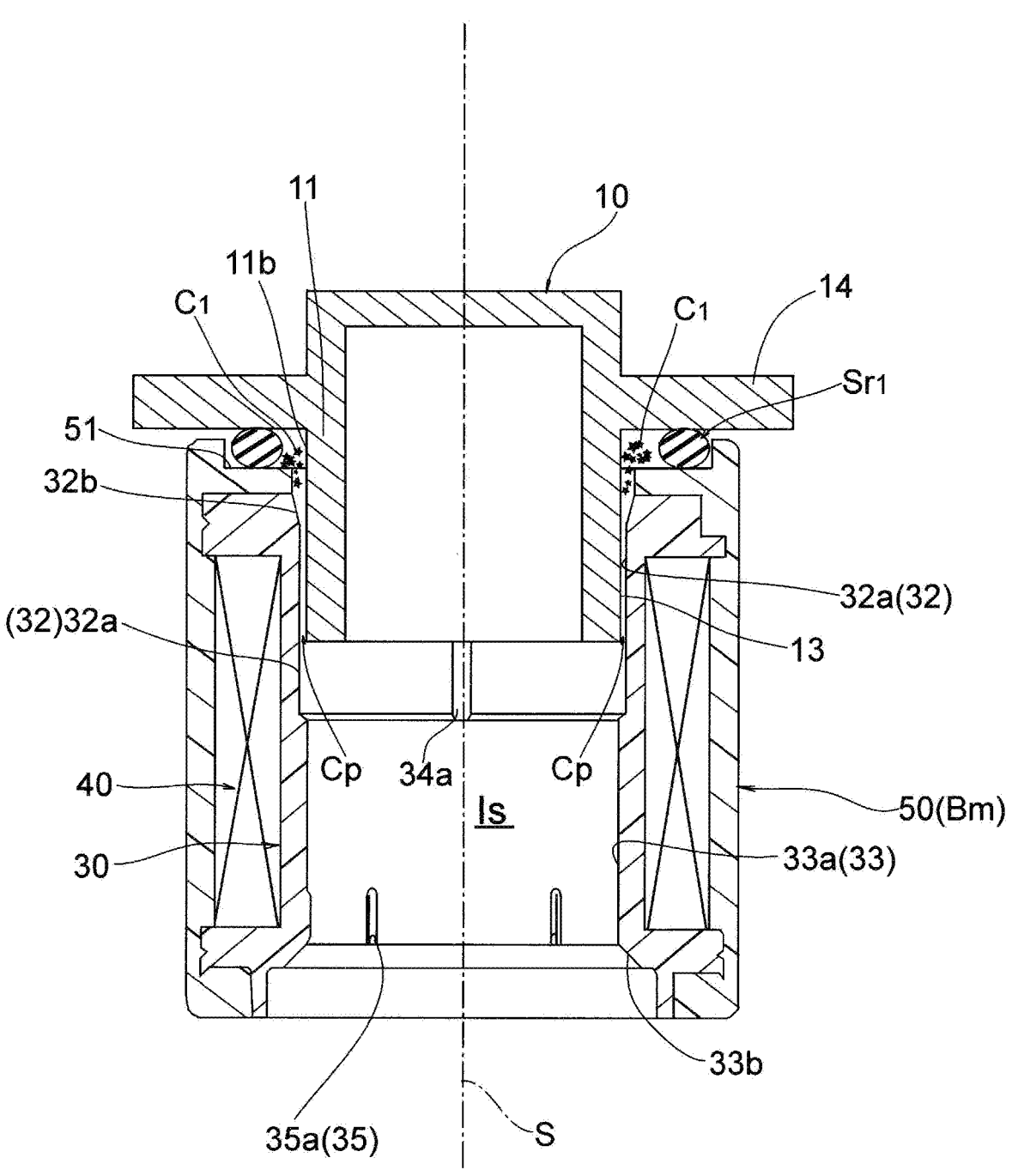
FIG. 17 is a cross-sectional view showing, in the electro-magnetic actuator according to an embodiment, a communication path defined by the first stator and the bobbin module after the first stator, the first annular seal member, and the bobbin module are assembled.
Figure 18:
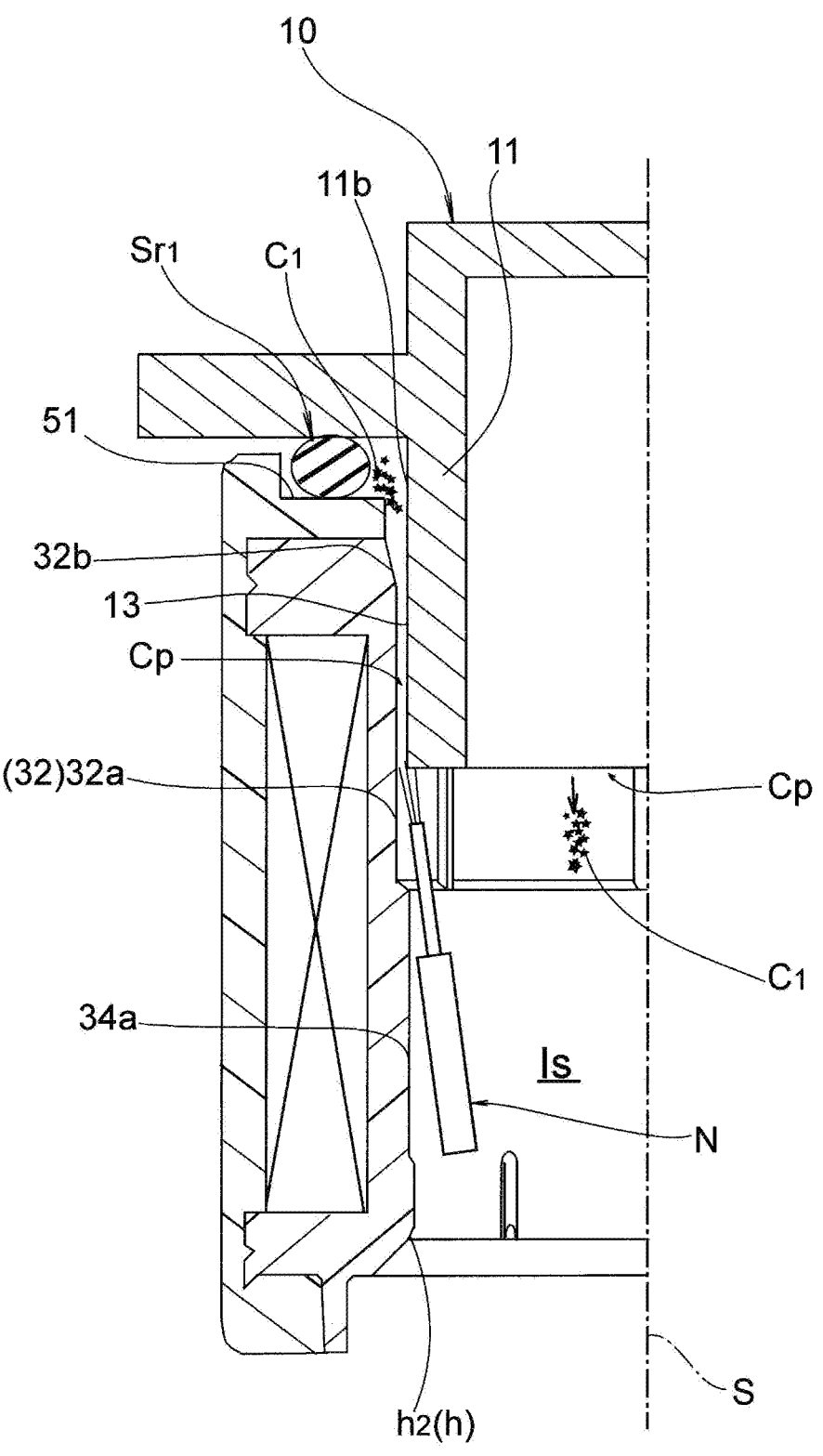
FIG. 18 is an enlarged partial cross-sectional view of an area of the communication path defined by the first stator and the bobbin module.
Figure 19:
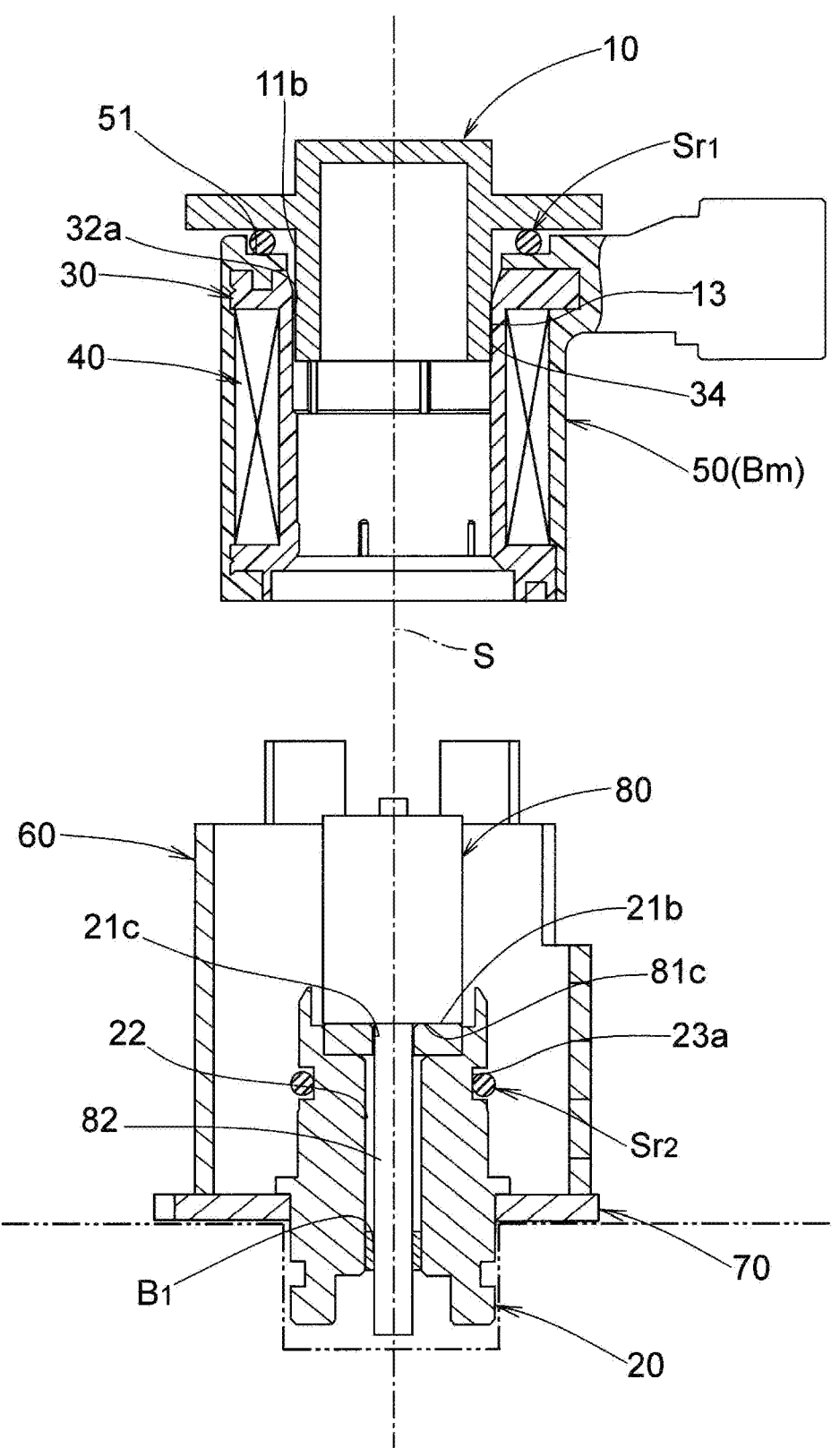
FIG. 19 is a process diagram showing assembly work of the second stator, a second annular seal member, and the bobbin module in the electromagnetic actuator according to an embodiment.
Figure 20:
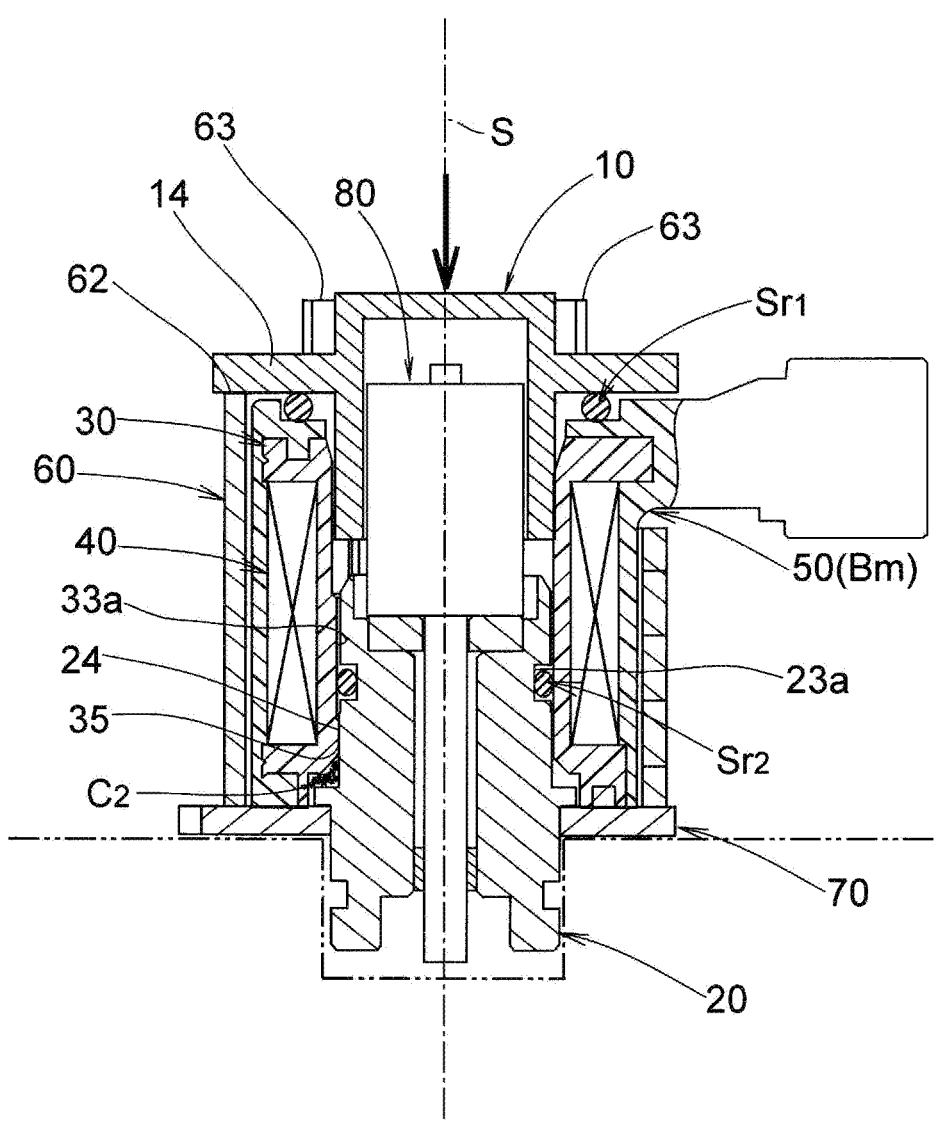
FIG. 20 is a process diagram showing assembly work of the second stator, the second annular seal member, and the bobbin module in the electromagnetic actuator according to an embodiment.

Subsequently, as shown in FIG. 14 to FIG. 16, the first stator 10 is fixed to the bobbin module Bm. That is, the annular seal member Sr₁ as the first annular seal member is fitted into the annular receiving part 51 of the outer cover member 50. Then, the cylindrical part 11 of the first stator 10 is inserted into the first through hole 32 of the bobbin 30 to a predetermined position, and the outer peripheral fitting part 13 of the first stator 10 is fitted into the first positioning part 34 as the protrusion.

Accordingly, the center line of the inner peripheral surface $11a$ of the first stator $10$ is positioned on the axis line S. The annular seal member $Sr_1$ is pressed by the flange $14$ of the first stator $10$, and blocks the gap between the inner wall surface $32a$ of the first through hole $32$ of the bobbin $30$ and the outer peripheral surface $11b$ of the first stator $10$ so as to prevent the gap from communicating with the outside.

Furthermore, in this assembled state, that is, in the assembled state in which the outer peripheral fitting part $13$ is fitted into the first positioning part $34$ as the protrusion, as shown in FIG. $16$ and FIG. $17$, the bobbin module Bm and the first stator $10$ are formed to define five communication paths Cp that communicate from an internal space Is of the through hole h deviated from the first positioning part $34$ to the annular seal member $Sr_1$. Specifically, the communication paths Cp are defined by five recessed areas between five ridges $34a$ between the outer peripheral surface $11b$ of the cylindrical part $11$ and the outer peripheral fitting part $13$ and the inner wall surface $32a$ and the annular tapered surface $32b$ of the bobbin $30$.

The outer peripheral fitting part $13$ is formed to be fitted halfway into the first positioning part $34$ in the axis line S direction in a state in which the fitting is completed. Accordingly, the internal space Is of the through hole h deviated from the first positioning part $34$ and the communication path Cp are always maintained in a communicating state without being separated by the outer peripheral fitting part $13$.

In a fitting (press-fitting) process of fitting the first stator $10$ into the bobbin module Bm, a portion of the protruding end of the first positioning part $34$ may be scraped off by the outer peripheral fitting part $13$ and shavings $C_1$ may occur. The shavings $C_1$ may enter an area facing the annular seal member $Sr_1$ during the fitting work.

Accordingly, as shown in FIG. $18$, an air injection nozzle N is inserted into the internal space Is from the other end opening $h_2$ of the through hole h, and high-speed air is injected into one of the communicating paths Cp. Accordingly, foreign matter such as the shavings $C_1$ that has entered the vicinity of the annular seal member $Sr_1$ can be discharged from another communication path Cp. If necessary, a suction nozzle may be arranged with respect to another communication path Cp to actively suck out the foreign matter such as the shavings $C_1$ that has entered.

Subsequently, as shown in FIG. $19$, the mover $80$ and the annular seal member $Sr_2$ as the second annular seal member are assembled to the second stator $20$. That is, the annular seal member $Sr_2$ is fitted into the annular groove $23a$ of the second stator $20$. The shaft $82$ of the mover $80$ is inserted into the insertion hole $22$ of the second stator $20$ and also slidably inserted into the guide holes $21c$ and $B_1$, and is maintained in a state in which the end face $81c$ is in contact with the stopper $21b$.

Subsequently, as shown in FIG. $20$, the second stator $20$ is fixed to the bobbin module Bm to which the first stator $10$ is assembled. That is, with the second stator $20$ to which the cylindrical member $60$ and the flat plate member $70$ are assembled fixed with a jig or the like, the bobbin module Bm is inserted inside the cylindrical member $60$, the second stator $20$ is inserted into the second through hole $33$ of the bobbin $30$, and the outer peripheral fitting part $24$ of the second stator $20$ is fitted into the second positioning part $35$.

An end face (annular end $52$ and protruding cylindrical part $37a$) of the bobbin module Bm contacts the flat plate member $70$, and the flange $14$ (joint surface $14b$) of the first stator $10$ is joined to the arc-shaped end face $62$ of the cylindrical member $60$.

Accordingly, the center lines of the inner peripheral surface $21a$ and the insertion hole $22$ of the second stator $20$ and the guide holes $21c$ and $B_1$ are positioned on the axis line S.

In this fitting process, when the outer peripheral surface $23$ of the second stator $20$ is inserted into the through hole h from one side in the axis line S direction, the outer peripheral surface $23$ is inserted into the second through hole $33$ without contacting the inner wall surface $33a$ and the second positioning part $35$ of the bobbin $30$, and the annular seal member $Sr_2$ moves so as to slide on a protruding end (inner edge) of the second positioning part $35$ while being held in the annular groove $23a$, and closely contacts the inner wall surface $33a$ located in the area deviated from the second positioning part $35$.

When the outer peripheral fitting part $24$ is fitted (press-fitted) into the second positioning part $35$ of the bobbin $30$, a portion of the protruding end of the second positioning part $35$ may be scraped off by the outer peripheral fitting part $24$ and shavings $C_2$ may occur. Even if the shavings $C_2$ occur, since the shavings $C_2$ occur to the rear (near side) of the annular seal member $Sr_2$ in a fitting direction (press-fitting direction), the shavings $C_2$ can be prevented from entering a space inside (back side) the annular seal member $Sr_2$, that is, a space in which the mover $80$ moves.

Subsequently, the first stator $10$ is fixed to the cylindrical member $60$. That is, the four crimping pieces $63$ are crimped so as to press the flange $14$ of the first stator $10$ from the outside.

The annular seal member $Sr_3$ is fitted into the annular groove $27a$ of the fitting part $27$ of the second stator $20$. Alternatively, the annular seal member $Sr_3$ may be fitted into the annular groove $27a$ in advance at a stage of preparing the second stator $20$. Accordingly, the assembly of the electromagnetic actuator is completed.

The annular seal member $Sr_3$ may be fitted into the annular groove $27a$ of the fitting part $27$ when the electromagnetic actuator is applied to the application object.

The above procedure of the assembly work is an example. The work may be performed on one assembly line without distinction between the sub-line and the main line, or other methods may be adopted for procedures including preparations or the like.

In this electromagnetic actuator, in a state before being applied to the application object, the mover $80$ is movable in the axis line S direction between the rest position (position where the rod $91$ contacts the inner wall surface $12a$) and the operating position (position where the end face $81c$ contacts the stopper $21b$).

When the electromagnetic actuator is attached to the application object, due to the return force of an energization member provided on the application object, the shaft $82$ is energized to retreat, and the protrusion $91b$ of the rod $91$ is held at the rest position in contact with the inner wall surface $12a$ of the first stator $10$, as shown in FIG. $4$ and FIG. $5$.

Next, an operation of the electromagnetic actuator in the state of being applied to the application object is described with reference to FIG. $21$ to FIG. $23$.

First, as shown in FIG. $21$, in a non-energized state in which the coil $40$ is not energized, the mover $80$ is pushed back by a return force F exerted by the application object, and is positioned in the rest position where the protrusion $91b$ of the rod $91$ is in contact with the bottom wall $12$ (inner wall surface $12a$).

In this rest state, when the coil $40$ is energized, a line of magnetic force (electromagnetic force) is generated that flows from the cylindrical part $11$ of the first stator $10$ into

Figure 22:
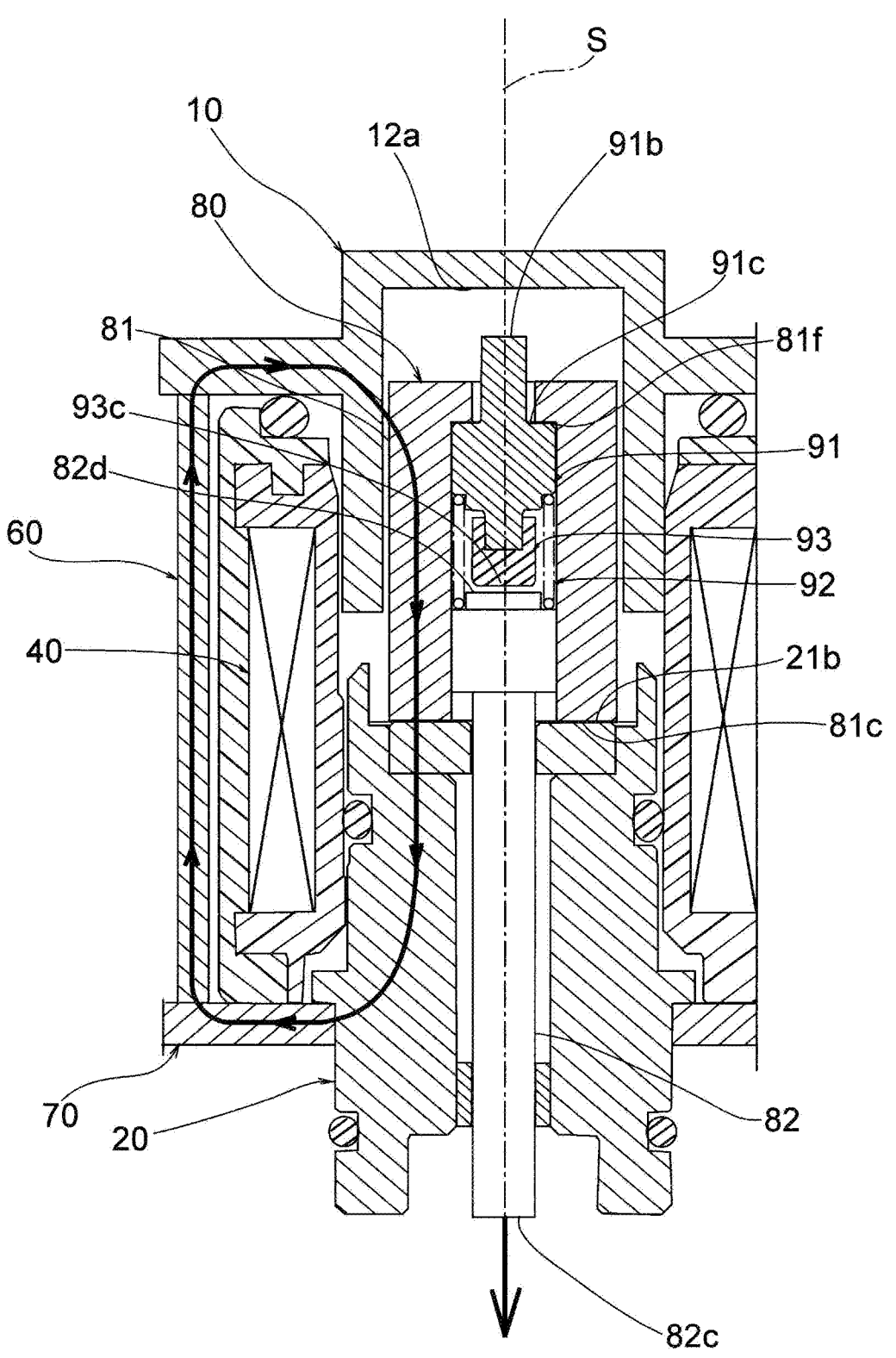
FIG. 22 describes an operation of the electromagnetic actuator according to an embodiment, and is a partial cross-sectional view showing a state in which the mover is located in an operating position.

15 the second stator 20 via the plunger 81 of the mover 80, and the plunger 81 is drawn toward the second stator 20. As shown in FIG. 22, the end face 81*c* of the plunger 81 moves to the operating position where it contacts the stopper 21*b* of the second stator 20 and stops, a driving force is applied to the application object and an operation such as switching is performed.

Figure 23:
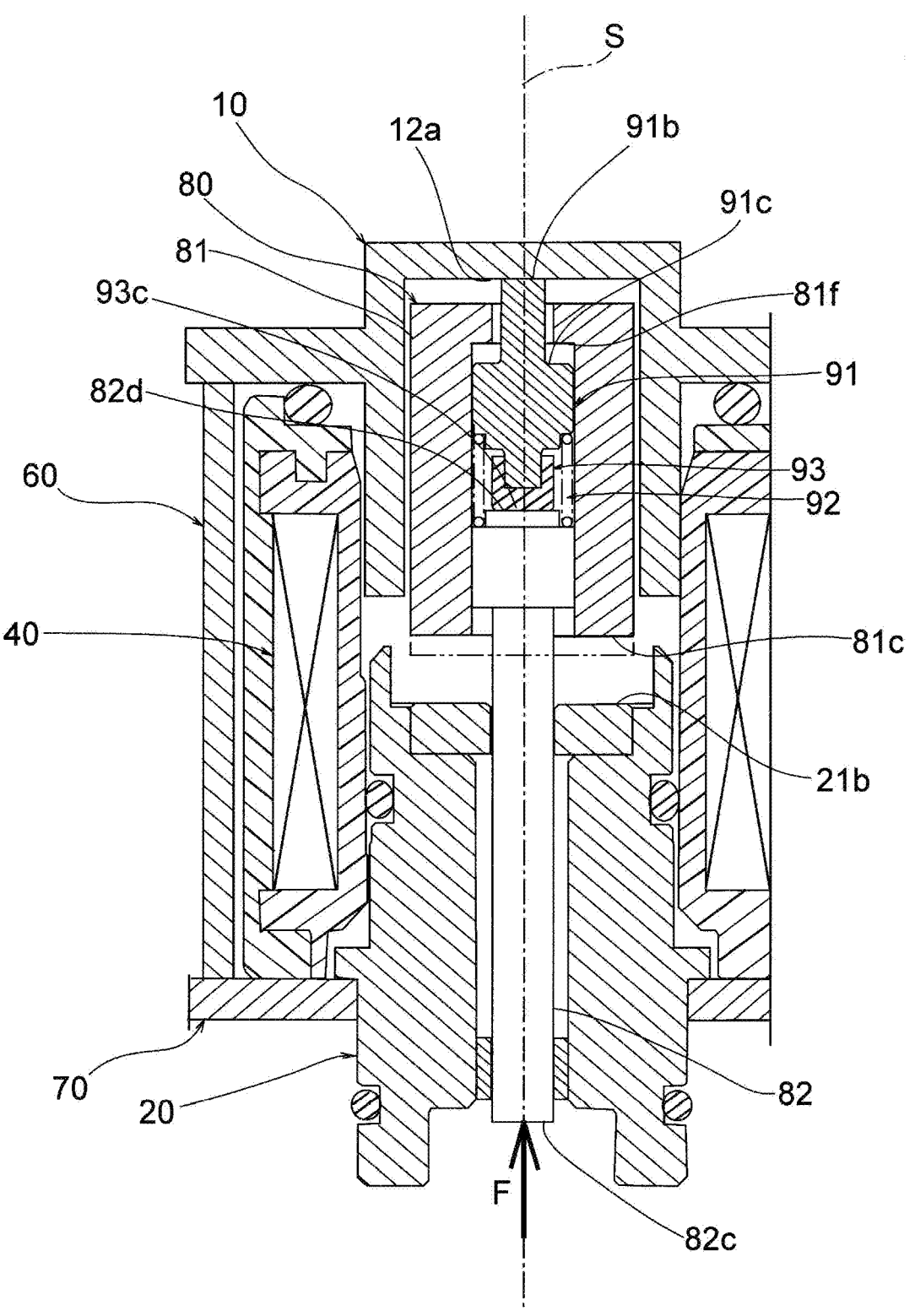
FIG. 23 describes an operation of the electromagnetic actuator according to an embodiment, and is a partial cross-sectional view showing a state in which the mover returns from the operating position to the rest position.

On the other hand, in this operating state, when the coil 40 is de-energized, the mover 80 is pushed back by the return force F exerted by the application object and retreats toward the rest position. During this retreat, first, the protrusion 91*b* of the rod 91 contacts the bottom wall 12 (inner wall surface 12*a*). As shown in FIG. 23, the mover 80 overtravels beyond the predetermined rest position (chain double-dashed line in FIG. 23) due to inertial force, and the buffer member 93 is elastically deformed between the rod 91 and the shaft 82. During this movement, an impact force of the plunger 81 (that is, mover 80) which moves integrally with the shaft 82 is absorbed.

Figure 21:
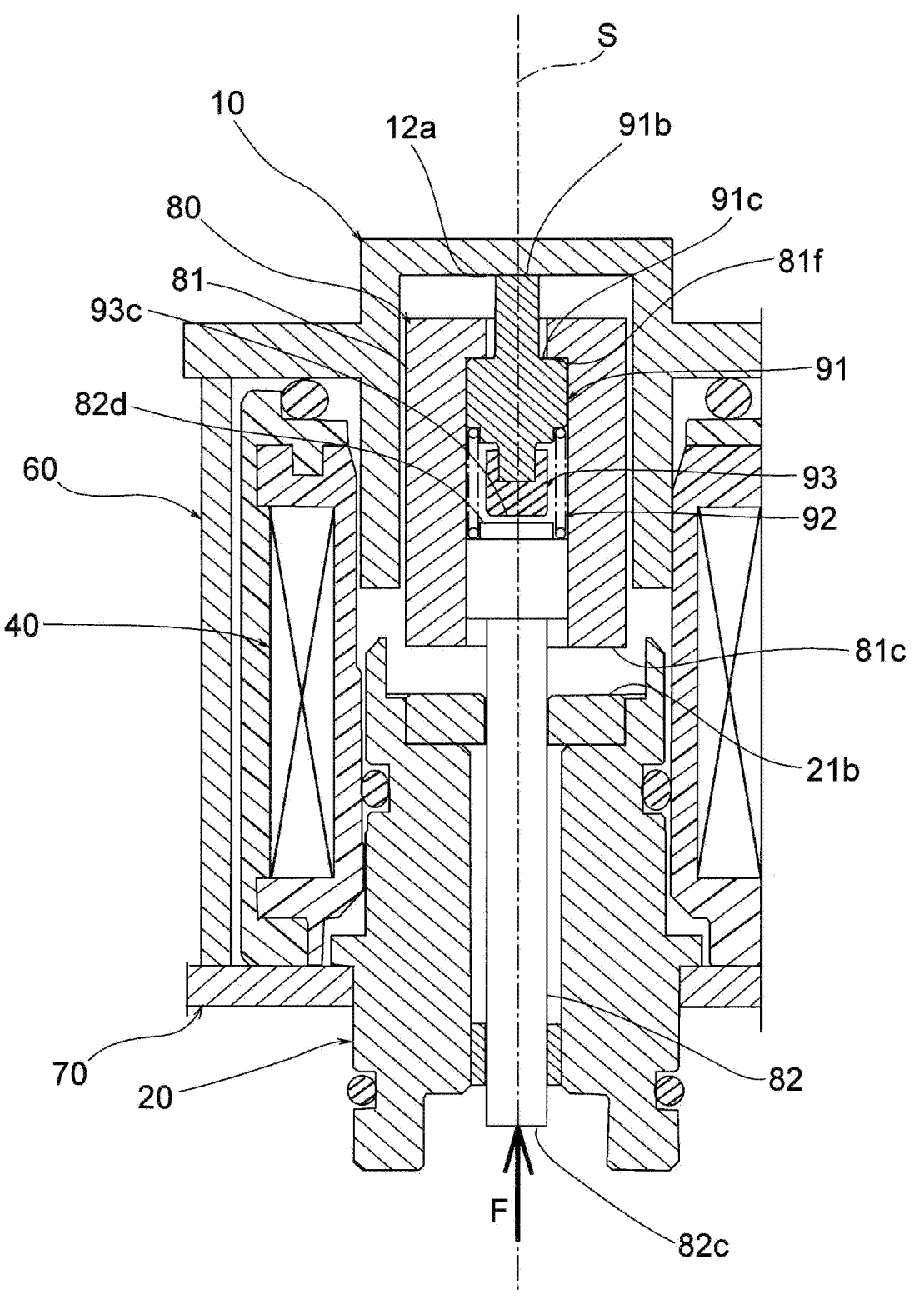
FIG. 21 describes an operation of the electromagnetic actuator according to an embodiment, and is a partial cross-sectional view showing a state in which the mover is located in a rest position.

Due to the energizing force of the energization member 92, the mover 80 that has overtraveled is pushed back in an opposite direction and stops at the predetermined rest position, as shown in FIG. 21.

In this way, due to the action of the buffer unit 90 (rod 91, energization member 92, and buffer member 93), the impact force when the mover 80 returns to the rest position is absorbed, and the mover 80 is positioned in the predetermined rest position with high accuracy.

According to the electromagnetic actuator according to the above embodiment, the bobbin module Bm includes: the through hole h (first through hole 32), through which the stator (first stator 10) passes in the axis line S direction; the bobbin side receiving part (annular receiving part 51), formed adjacent to the outer side of the one end opening $h_1$ of the through hole h and receiving the first annular seal member (annular seal member $Sr_1$); and the protrusion (first positioning part 34), formed protruding from the inner wall surface 32*a* near the one end opening $h_1$ of the through hole h. The stator (first stator 10) includes: the outer peripheral fitting part 13, fitted into the protrusion (first positioning part 34); and the stator side receiving part (flange 14), receiving the first annular seal member (annular seal member $Sr_1$) in cooperation with the bobbin side receiving part (annular receiving part 51). The bobbin module Bm and the stator (first stator 10) may define the communication path Cp that communicates from the internal space Is of the through hole h deviated from the protrusion (first positioning part 34) to the first annular seal member (annular seal member $Sr_1$) in the assembled state in which the outer peripheral fitting part 13 is fitted into the protrusion (first positioning part 34).

According to this, even if the shavings $C_1$ occur and enter the area facing the annular seal member $Sr_1$ during the fitting work, high-speed air can be injected into the communication path Cp using an air injection nozzle or the like, and foreign matter such as the shavings $C_1$ that has entered can be discharged from another communication path Cp.

That is, while the structure is simplified, the cost is reduced and the number of parts is reduced, foreign matter such as the shavings $C_1$ can be removed and smooth operation of the mover 80 can be ensured.

The bobbin module Bm includes the annular tapered surface 32*b* in the inner peripheral area of the one end opening $h_1$ of the through hole h. The first positioning part 34 as the protrusion is formed in the area deviated from the annular tapered surface 32*b* in the axis line S direction. Thereby, during the fitting work, the occurrence of the shavings $C_1$ or the like in the vicinity of the bobbin side receiving part (annular receiving part 51) can be suppressed or prevented, and foreign matter such as the shavings $C_1$ that has entered can be smoothly discharged to the outside from the communication path Cp along the annular tapered surface 32*b*.

The protrusion, as the first positioning part 34, includes a plurality of ridges 34*a* that protrude from the inner wall surface 32*a* of the first through hole 32 in the area of the first through hole 32 and extend in the axis line S direction. The communication path Cp is defined by the recessed area between the plurality of ridges 34*a*. By fitting the outer peripheral fitting part 13 halfway into the first positioning part 34 in the axis line S direction, the internal space Is of the through hole h and the communication path Cp can always be maintained in a communicating state.

Since the protrusion is the first positioning part 34 that positions the first stator 10 on the axis line S, the first stator 10 can be positioned on the axis line S without adopting a dedicated positioning member. Hence, the structure can be simplified, the cost can be reduced and the number of parts can be reduced. In particular, since a portion of the through hole h of the bobbin 30 is used as the first positioning part 34, the fitting work can be smoothly performed. The occurrence of excessive fitting stress in the bobbin 30 can be suppressed, and damage to the bobbin 30 or the like can be prevented.

The first stator 10 includes: the cylindrical part 11, defining the inner peripheral surface 11*a* that receives the mover 80 (plunger 81); the bottom wall 12, blocking one end side of the cylindrical part 11 and defining the rest position of the mover 80; and the flange 14, extending in the radial direction from the cylindrical part 11. The second stator 20 includes: the insertion hole 22, receiving the mover 80 (shaft 82) and exposing the mover 80 (shaft 82) at the tip thereof. The flange 14 is adopted as the stator side receiving part, and the annular receiving part 51 formed in the outer cover member 50 of the bobbin module Bm is adopted as the bobbin side receiving part. Thereby, the bobbin module Bm can be held while being sealed with the annular seal member $Sr_1$ in the axis line S direction and an elastic energizing force can be applied.

The mover 80 includes: the plunger 81, made of a magnetic material; and the shaft 82, made of a nonmagnetic material, fixed to the plunger 81 and exerting the driving force to the outside. The second stator 20 includes: the stopper 21*b*, defining the operating position of the mover 80; and the guide holes 21*c* and $B_1$, slidably guiding the shaft 82. By the inner peripheral surface 11*a* of the first stator 10 receiving the plunger 81 in a non-contact manner to be capable of reciprocating and by the insertion hole 22 of the second stator 20 receiving the shaft 82 in a non-contact manner to be capable of reciprocating, the mover 80 can be accommodated so as to smoothly reciprocate with respect to the first stator 10 and the second stator 20.

Since the second stator 20 includes the stopper 21*b* that defines the operating position of the mover 80, the operating position of the mover 80 can be defined by the electromagnetic actuator itself without depending on a structure of the application object.

As described above, according to the electromagnetic actuator according to an embodiment, while the structure is simplified, the cost is reduced and the number of parts is reduced, foreign matter such as the shavings $C_1$ can be removed and smooth operation of the mover 80 can be ensured.

Figure 24:
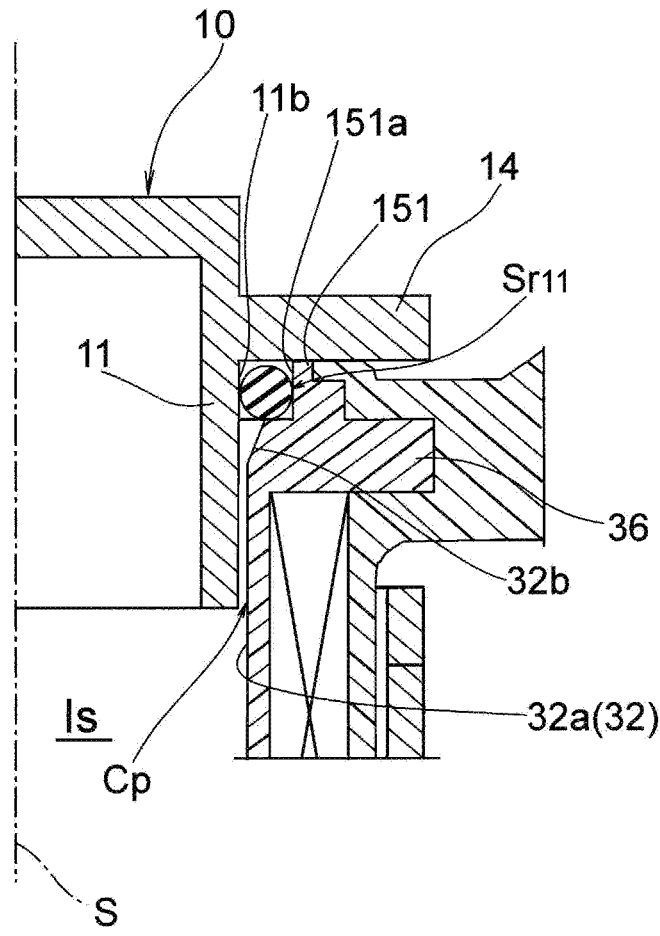
FIG. 24 is a cross-sectional view showing an assembled state of the first stator, the first annular seal member, and the bobbin module in an electromagnetic actuator according to another embodiment.

In the above embodiments, a configuration is shown in which the annular seal member $Sr_1$ as the first annular seal member is interposed between the annular receiving part 51 and the flange 14 in order to exert a sealing action in the axis line S direction. However, the disclosure is not limited thereto. As shown in FIG. 24, the following configuration may be adopted. Instead of the annular receiving part 51, a protruding cylindrical part 151 protruding from the flange 36 in the axis line S direction is adopted as the bobbin side receiving part. The outer peripheral surface 11*b* of the first stator 10 is adopted as the stator side receiving part. A first annular seal member $Sr_{11}$ is arranged between an inner wall surface 151*a* of the protruding cylindrical part 151 and the outer peripheral surface 11*b* of the first stator 10. The communication path Cp is defined that communicates from the internal space Is to the first annular seal member $Sr_{11}$.

In the above embodiments, the first positioning part 34 including five ridges 34*a* is shown as the protrusion. However, the disclosure is not limited thereto, and a protrusion in other forms may be adopted.

In the above embodiments, a configuration is shown including the first stator 10 and the second stator 20 as the stator. However, the disclosure is not limited thereto, and a stator in other forms may be adopted.

As described above, in the electromagnetic actuator of the disclosure, while the structure is simplified, the cost is reduced and the number of parts is reduced, foreign matter such as shavings can be removed and smooth operation of the mover can be ensured. Thus, the electromagnetic actuator of the disclosure is not only applicable for a switching operation of various switching mechanisms related to an engine or a vehicle, but is also useful in a switching mechanism or the like in other fields.

The invention claimed is:

1. An electromagnetic actuator comprising:
a mover, reciprocating along a predetermined axis line;
a stator, accommodating the mover to be capable of reciprocating in a direction of the axis line;
a bobbin module, arranged around the stator; and
a first annular seal member, interposed between the bobbin module and the stator, wherein
the bobbin module comprises: a through hole, through which the stator passes in the direction of the axis line; a bobbin side receiving part, formed adjacent to an outer side of one end opening of the through hole and receiving the first annular seal member; and a protrusion, formed protruding from an inner wall surface near the one end opening of the through hole;
the stator comprises: an outer peripheral fitting part, fitted into the protrusion; and a stator side receiving part, receiving the first annular seal member in cooperation with the bobbin side receiving part; and
the bobbin module and the stator define a communication path that communicates from an internal space of the through hole deviated from the protrusion to the first annular seal member in an assembled state in which the outer peripheral fitting part is fitted into the protrusion.
2. The electromagnetic actuator according to claim 1, wherein
the bobbin module comprises an annular tapered surface in an inner peripheral area of the one end opening of the through hole; and
the protrusion is formed in an area deviated from the annular tapered surface in the direction of the axis line.
3. The electromagnetic actuator according to claim 1, wherein
the stator comprises a first stator and a second stator arranged spaced apart in the direction of the axis line; and the first annular seal member is arranged between the first stator and the bobbin module.
4. The electromagnetic actuator according to claim 3, wherein
the mover is provided with a buffer unit that absorbs impact upon the mover contacting the first stator and returning to a rest position.
5. The electromagnetic actuator according to claim 3, wherein
the first stator comprises: a cylindrical part, defining an inner peripheral surface that receives the mover; a bottom wall, blocking one end side of the cylindrical part and defining a rest position of the mover; and a flange, extending in a radial direction from the cylindrical part; and
the second stator comprises an insertion hole that receives the mover and exposes the mover at a tip thereof.
6. The electromagnetic actuator according to claim 5, wherein
the stator side receiving part is the flange; and
the bobbin side receiving part is an annular receiving part formed in the bobbin module to receive the first annular seal member in cooperation with the flange in the direction of the axis line.
7. The electromagnetic actuator according to claim 5, wherein
the mover comprises: a plunger, made of a magnetic material; and a shaft, made of a nonmagnetic material, fixed to the plunger, and exerting a driving force to the outside;
the second stator comprises: a stopper, defining an operating position of the mover; and a guide hole, slidably guiding the shaft;
the inner peripheral surface of the first stator receives the plunger in a non-contact manner to be capable of reciprocating; and
the insertion hole of the second stator receives the shaft in a non-contact manner to be capable of reciprocating.
8. The electromagnetic actuator according to claim 3, further comprising:
an outer magnetic path member, connected to the first stator and the second stator and forming a magnetic path.
9. The electromagnetic actuator according to claim 8, wherein
the outer magnetic path member comprises: a cylindrical member, connected to the first stator and surrounding the bobbin module; and a flat plate member, connected to the second stator and the cylindrical member.
10. The electromagnetic actuator according to claim 9, wherein
the flat plate member also serves as a flange member for attachment to an attachment object.
11. The electromagnetic actuator according to claim 3, wherein
the bobbin module comprises: a bobbin, defining the through hole and the protrusion; a coil for excitation, wound around the bobbin; and an outer cover member, covering the coil and in which a connector that surrounds a terminal connected to an end of the coil is formed.
12. The electromagnetic actuator according to claim 11, wherein
the bobbin side receiving part is formed in the outer cover member or the bobbin.
13. The electromagnetic actuator according to claim 11, wherein a second annular seal member is arranged between the second stator and the bobbin.

14. The electromagnetic actuator according to claim 11, wherein the bobbin comprises: a first positioning part, formed near the one end opening of the through hole in the direction of the axis line and positioning the first stator on the axis line; and a second positioning part, formed near the other end opening of the through hole in the direction of the axis line and positioning the second stator on the axis line; and the protrusion is the first positioning part.

15. The electromagnetic actuator according to claim 14, wherein the through hole comprises: a first through hole, centered on the axis line; and a second through hole, adjacent to the first through hole in the direction of the axis line and having a smaller diameter than the first through hole;

the first positioning part comprises, in an area of the first through hole, a plurality of ridges protruding from an inner wall surface of the first through hole and extending in the direction of the axis line; and the communication path is defined by a recessed area between the plurality of ridges.

16. The electromagnetic actuator according to claim 15, wherein the outer peripheral fitting part is fitted halfway into the first positioning part in the direction of the axis line.

\*   \*   \*   \*   \*